United States Patent
Kim et al.

(10) Patent No.: US 11,102,626 B2
(45) Date of Patent: Aug. 24, 2021

(54) ELECTRONIC DEVICE AND COMMUNICATION RELAYING METHOD THEREOF

(71) Applicant: SAMSUNG ELECTRONICS CO., LTD., Suwon-si (KR)

(72) Inventors: Jaehan Kim, Suwon-si (KR); Kilyeon Kim, Suwon-si (KR); Yunsun Baek, Suwon-si (KR); Saemi Lim, Suwon-si (KR); Jiyoun Jung, Suwon-si (KR); Yeongmin Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 108 days.

(21) Appl. No.: 16/535,326

(22) Filed: Aug. 8, 2019

(65) Prior Publication Data

US 2020/0053521 A1 Feb. 13, 2020

(30) Foreign Application Priority Data

Aug. 8, 2018 (KR) ........................ 10-2018-0092719

(51) Int. Cl.
  *H04W 4/16* (2009.01)
  *H04M 3/42* (2006.01)
  *H04M 3/436* (2006.01)

(52) U.S. Cl.
  CPC ......... *H04W 4/16* (2013.01); *H04M 3/42042* (2013.01); *H04M 3/4365* (2013.01)

(58) Field of Classification Search
  CPC ............. H04M 1/006; H04M 3/42263; H04M 1/72412; H04M 3/4365; H04M 3/543;

(Continued)

(56) References Cited

U.S. PATENT DOCUMENTS 9,325,753 B2   4/2016  Walters et al.
2003/0078844 A1* 4/2003  Takatori ................. G06Q 20/12
                                                 705/17

(Continued)

FOREIGN PATENT DOCUMENTS

EP        1940096        12/2006
KR   10-2016-0061846      6/2016

OTHER PUBLICATIONS

International Search Report and Written Opinion dated Nov. 20, 2019 in counterpart International Patent Application No. PCT/KR2019/010016.

(Continued)

*Primary Examiner* — Congvan Tran
(74) *Attorney, Agent, or Firm* — Nixon & Vanderhye, P.C.

(57) ABSTRACT

According to an embodiment, an electronic device may include a communication circuit, a display, a processor, and a memory. The memory may be store instructions which, when executed, configure the processor to control the electronic device to: control the communication circuit to receive a call from a first external electronic device, identify a receiving phone number of the call, identify a second external electronic device in a communication group set corresponding to the receiving phone number among at least one phone number registered based on information about a user account stored in the memory, and control the communication circuit to relay the call to the identified second external electronic device.

18 Claims, 24 Drawing Sheets

(58) Field of Classification Search
CPC ......... H04M 3/42042; H04M 1/72448; H04W 4/16; H04W 88/04; H04L 65/1016; H04L 61/1547; H04L 65/1073
USPC ......................................................... 455/518
See application file for complete search history.

(56) References Cited

U.S. PATENT DOCUMENTS

| | | |
|---|---|---|
| 2008/0002820 A1 | 1/2008 | Shtiegam et al. |
| 2010/0002862 A1 | 1/2010 | Arao et al. |
| 2015/0024726 A1 | 1/2015 | Salisbury et al. |
| 2015/0029900 A1* | 1/2015 | Patel ................. H04M 7/006 370/261 |
| 2015/0350129 A1 | 12/2015 | Cary et al. |
| 2016/0119469 A1 | 4/2016 | Schei et al. |
| 2017/0012974 A1 | 1/2017 | Sierra et al. |
| 2017/0180956 A1* | 6/2017 | Lefar ............... H04L 29/12754 |
| 2017/0187877 A1* | 6/2017 | Smith .............. H04M 3/42059 |

OTHER PUBLICATIONS

Extended Search Report dated Dec. 17, 2019 in counterpart European Patent Application No. 19190723.7.

* cited by examiner

ELECTRONIC DEVICE AND COMMUNICATION RELAYING METHOD THEREOF

CROSS-REFERENCE TO RELATED APPLICATION

This application is based on and claims priority under 35 U.S.C. § 119 to Korean Patent Application No. 10-2018-0092719, filed on Aug. 8, 2018, in the Korean Intellectual Property Office, the disclosure of which is incorporated by reference herein in its entirety.

BACKGROUND

Field

The disclosure relates to electronic devices and communication relaying methods of the same.

Description of Related Art

A plurality of electronic devices may connect to each other to provide the user with continuity between the electronic devices.

For example, when the user's smartphone and tablet PC are connected together via communication (e.g., Wi-Fi or Bluetooth), the user may take phone calls, which are supposed to go to the smartphone, by the tablet PC and share text messages, which are received by the smartphone, with the tablet PC.

A plurality of electronic devices may be connected based on a user account. Establishing a connection by grouping the plurality of electronic devices using only user account information may result in the need for creating a new account when intending to add a group with only some devices.

When the user sets a plurality of groups by creating a plurality of accounts, frequent switch may be needed from one account to another depending on the group to be managed (e.g., logout from the current account and login to another account). This is quite bothersome.

The above information is presented as background information only to assist with an understanding of the disclosure. No determination has been made, and no assertion is made, as to whether any of the above might be applicable as prior art with regard to the disclosure.

SUMMARY

According to various example embodiments, an electronic device and communication relaying method thereof, which may increase use convenience and result in efficiency in relation to the communication relaying function capable of implementing inter-electronic device continuity may be provided.

According to various example embodiments, an electronic device and communication relaying method thereof, which enable simplified registration of one or more groups for communication relaying in one user account without the need for adding an account may be provided.

According to various example embodiments, an electronic device and communication relaying method thereof, which enable simplified management of one or more groups for communication relaying registered in a logged-in account without the need for switching accounts may be provided.

In accordance with various example embodiments, an electronic device may include a communication circuit, a display, a processor, and a memory. The memory may be store instructions which, when executed, configure the processor to control the electronic device to: control the communication circuit to receive a call from a first external electronic device, identify a receiving phone number of the call, identify a second external electronic device in a communication group set corresponding to the receiving phone number among at least one phone number registered based on information about a user account stored in the memory, and control the communication circuit to relay the call to the identified second external electronic device.

In accordance with various example embodiments, an electronic device may include a communication circuit, a display, a processor, and a memory. The memory may be store instructions which, when executed, configure the processor to control the electronic device to: control the display to display a settings screen for setting at least one communication group corresponding to at least one phone number registered in the user account, each communication group including the electronic device and at least one external electronic device, wherein a communication relaying function based on a same phone number is provided in the same communication group, generate a request for setting the at least one communication group based on an input on the settings screen, and control the communication circuit to transmit the request to an external server.

In accordance with various example embodiments, a method of relaying communication by an electronic device comprises receiving, by the electronic device, a call from a first external electronic device, identifying, by the electronic device, a receiving phone number of the call, identifying, by the electronic device, a second external electronic device in a communication group set corresponding to the receiving phone number among at least one phone number registered based on a user account, and relaying, by the electronic device, the call to the identified second external electronic device.

Other aspects, advantages, and salient features of the disclosure will become apparent to those skilled in the art from the following detailed description, which, taken in conjunction with the annexed drawings, discloses example embodiments of the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

Throughout the drawings, like reference numerals will be understood to refer to like elements.

DETAILED DESCRIPTION

Figure 1:
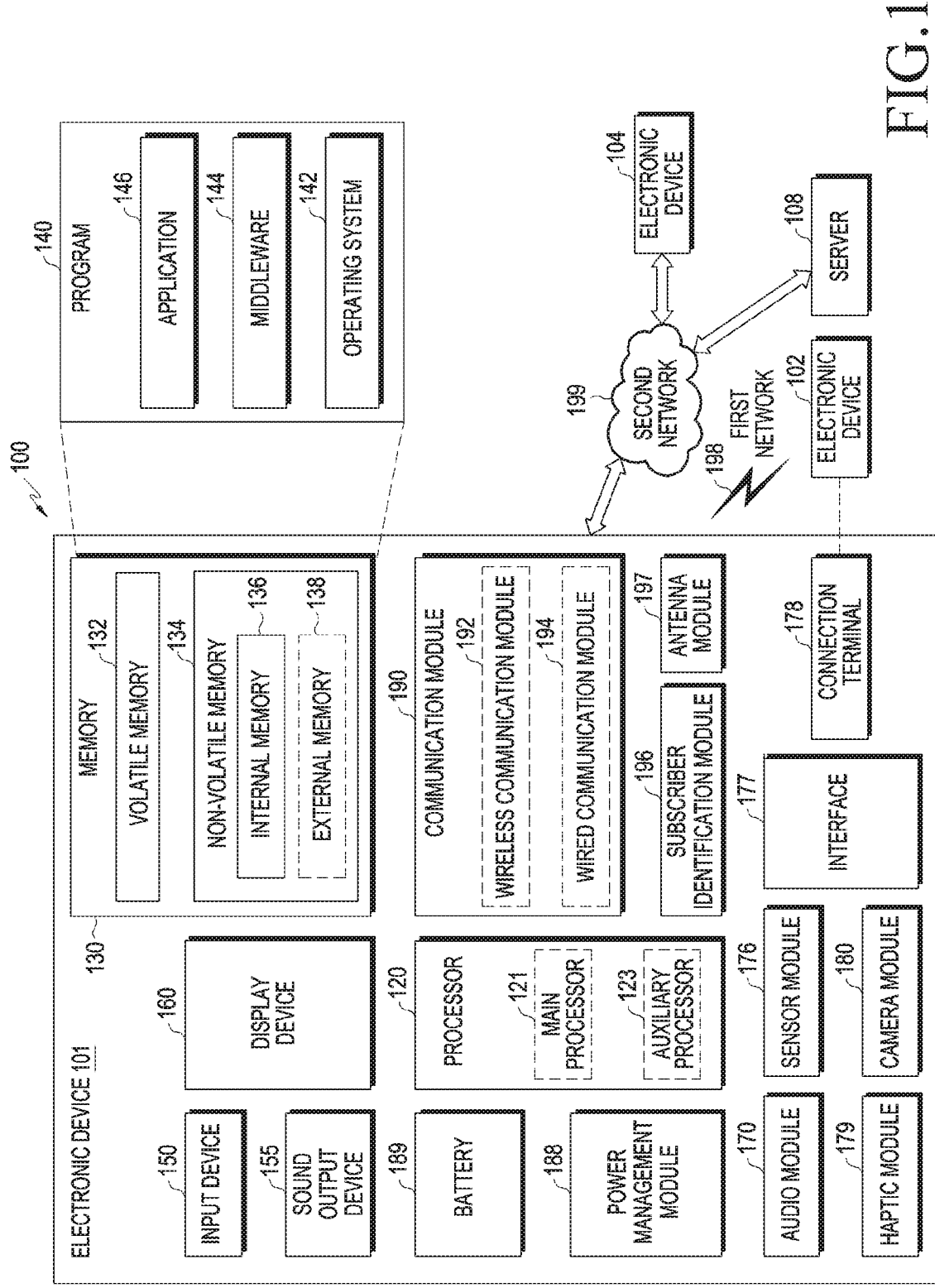
FIG. 1 is a block diagram illustrating an example electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a recording, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 1801, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, a first electronic device (e.g., the electronic device 101 of FIG. 1) may refer, for example, to a device capable of accessing a network (e.g., the second network 199 (e.g., a remote wireless communication network) of FIG. 1) to use communication functionality. For example, the first electronic device may be a device including a subscriber identity module (SIM) (e.g., a SIM card). The first electronic device may, for example, be a primary device.

According to an embodiment, a second electronic device (e.g., the electronic device 102 of FIG. 1) may refer, for example, to a device capable of communicating with an external electronic device connected with a network (e.g., the second network 199 (e.g., a remote wireless communication network) of FIG. 1) via the first electronic device. For example, the second electronic device may be a device which includes no SIM. The second electronic device may, for example, be a secondary device.

The second electronic device may refer, for example, to a device which may access a network (e.g., the second network 199 (e.g., a remote wireless communication network) of FIG. 1) to use communication functionality separately from use of the communication relaying function via the first electronic device. For example, the second electronic device (e.g., a wearable device) may communicate with the first electronic device via short-range wireless communication (e.g., Bluetooth). As another example, the second electronic device (e.g., a tablet PC) may access a network (e.g., the second network 199 (e.g., a remote wireless communication network) of FIG. 1) via short-range wireless communication (e.g., Wi-Fi).

A device including a SIM may, for example, be set as a primary device of a communication group. A device including a SIM may, for example, be set as a secondary device of a communication group.

For example, the first electronic device and/or the second electronic device may, for example, and without limitation, be a portable communication device (e.g., a smartphone), a wearable device (e.g., a smart watch), a portable computer (e.g., a tablet PC or laptop computer), a computer, a smart home appliance (e.g., a smart TV), or the like.

According to an embodiment, a communication group may refer, for example, to a group of one first electronic device and second electronic device(s) connected with the first electronic device. Communication between a network (e.g., the second network 199 (e.g., a remote wireless communication network) of FIG. 1) and the second electronic device not connected with the network may be relayed by the first electronic device. The first electronic device and the second electronic device may be connected via, e.g., a second network (e.g., the first network 198 (e.g., a short-range wireless communication network) of FIG. 1).

According to an embodiment, a plurality of phone numbers may be registered in one user account, and a communication group including a first electronic device and at least one second electronic device may be set corresponding to each phone number. Each phone number may be used as a group identity (ID) to distinguish between the communication groups.

According to an embodiment, a communication relaying function may refer, for example, to a function or service for relaying communication between a network (e.g., the second network 199 (e.g., a remote wireless communication network) of FIG. 1) (or an external electronic device connected with the network) and a second electronic device not connected with the network. For example, the communication relaying function may be a function of supporting a plurality of electronic devices to be able to communicate with each other using one phone number. The communication relaying function may, for example, be a function connecting a plurality of electronic devices together to provide continuity among the electronic devices. The communication relaying function may, for example, be a function synchronizing the states of a plurality of electronic devices.

The communication relaying function may include, for example, and without limitation, at least one of, a call forking function, a message (e.g., short messaging service (SMS) message, a multimedia messaging service (MMS) message, social networking service (SNS) message, etc.) sync function, a phone call log sync function, or the like.

Call may include the concept of, for example, and without limitation, a voice call, video call, media call (e.g., Internet protocol (IP) multimedia subsystem (IMS) call), relayed call, or the like.

The call forking function may refer, for example, to a call sync function and/or a call forwarding function. For example, the call forking function may include a phone conversation relaying function.

The call forking function may, for example, be a function to invoke a phone call at one phone number for requesting a call and allow multiple (e.g., two) electronic devices to ring or vibrate. For example, when one of the electronic devices receives the call, a cancel message may be sent out so that the call requests to the other electronic device(s) are terminated.

According to an embodiment, the call forking function may, for example, be a function to relay a call between an external electronic device (e.g., the electronic device 104 of FIG. 1) connected with a network (e.g., the second network 199 (e.g., a remote wireless communication network) of FIG. 1) and the first electronic device to the second electronic device not connected with the network, thereby providing the call between the second electronic device and the external electronic device. For example, a phone call from the external electronic device through the network (e.g., the second network 199 (e.g., a remote wireless communication network) of FIG. 1) to the first electronic device may be received by the second electronic device registered in a server (e.g., an account managing server) on the network or may be sent from the second electronic device through the first electronic device and the network to the external electronic device. As another example, the first electronic device may forward media received from the external electronic device to the second electronic device and media received from the second electronic device to the external electronic device. The call between the first electronic device and the second electronic device may be connected through a first network (e.g., the second network 199 (e.g., a remote wireless communication network, such as a cellular network) of FIG. 1) or a second network (e.g., the first network 198 (e.g., a short-range wireless communication network) of FIG. 1).

The call forking function may, for example, be a function to transmit messages (e.g., SMS/MMS/SNS messages) sent at one phone number to a plurality of electronic devices.

The message sync function may, for example, be a function to share or sync the respective messages of a plurality of electronic devices. Message transmission and reception via a network between the external electronic device and the first electronic device may be relayed to the second electronic device.

The phone call log sync function may, for example, be a function to share or sync the respective phone call logs of a plurality of electronic devices. The phone call log stored in the first electronic device may be transmitted to the second electronic device(s) so that the second electronic device may identify the phone call log.

According to an embodiment, a communication relaying function may, for example, be provided for a plurality of electronic devices registered in one communication group. For example, the plurality of electronic devices in the communication group may communicate with each other based on the same phone number. For example, at least one phone number may be registered in a user account, and at least one communication group may be set corresponding to each phone number. Each communication group may include a first electronic device with at least one phone number and at least one second electronic device.

Setting a communication group may, for example, and without limitation, include at least any one of generate group, add group, add device, update group, delete group, delete device, or the like.

For example, add group (generating or adding a communication group) may be performed when the user intends to use the communication relaying function on the first electronic device after purchasing the first electronic device or when the communication relaying function is first activated on the first electronic device.

For example, add device (adding a device to a communication group) may be performed when the user purchases the second electronic device and connects the second electronic device to the first electronic device to thereby use the communication relaying function or when the communication relaying function is first activated on the second electronic device.

For example, update group (updating a communication group) may be performed when the user changes the primary device to a new electronic device by moving the SIM (e.g., a SIM card) from the existing electronic device to the new electronic device or when the user intends to change the communication relaying function activation state of the communication group or the nickname of the communication group.

For example, delete group (deleting a communication group) may be performed when the user intends to delete the account or desires to disconnect the communication relaying function of a particular communication group (e.g., when changing phone numbers).

For example, delete device (deleting a device from a communication group) may be performed when the user deletes a particular device belonging to a communication group from the communication group (e.g., when changing the first electronic device paired with the second electronic device, e.g., a smart watch).

The following description focuses primarily on example embodiments in which two phone numbers (e.g., a first phone number and a second phone number) are registered in one user account, and two communication groups are set corresponding to each phone number. However, the scope of the disclosure is not limited thereto, and other various embodiments may be possible as well. For example, a plurality of communication groups may be set for one user account. As another example, one or more (e.g., three or more) phone numbers may be registered for one user account, a communication group may be set corresponding to each phone number, and a communication relaying function may be provided per communication group.

Figure 2A:
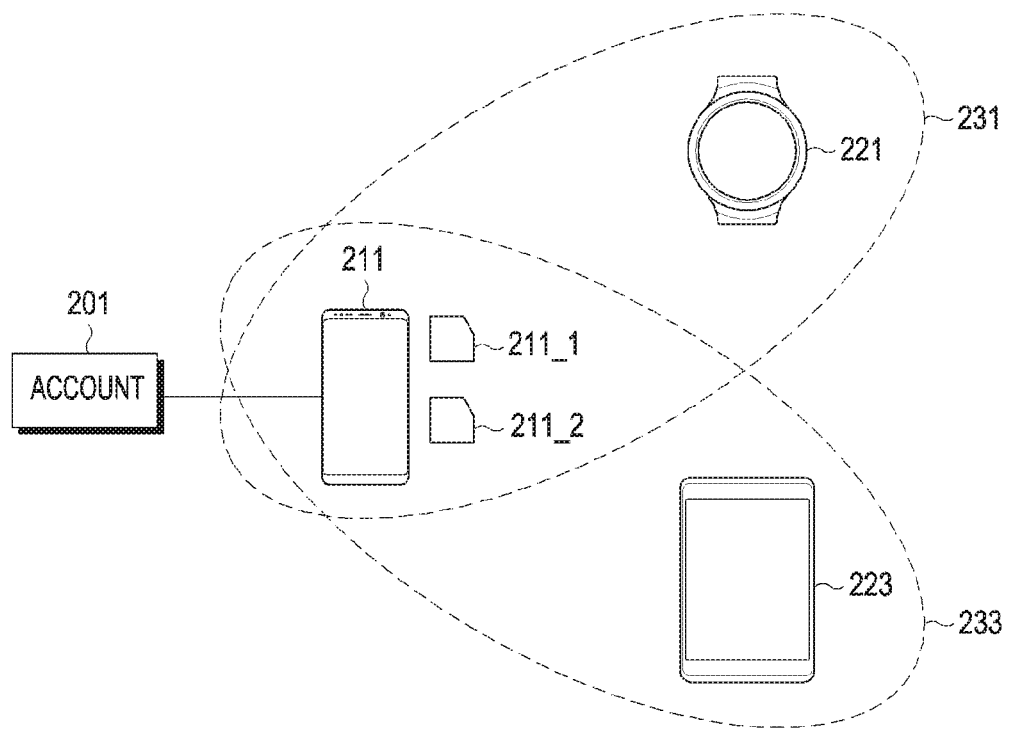
FIGS. 2A, 2B, and 2C are diagrams illustrating an example communication group according to an embodiment.
Figure 2B:
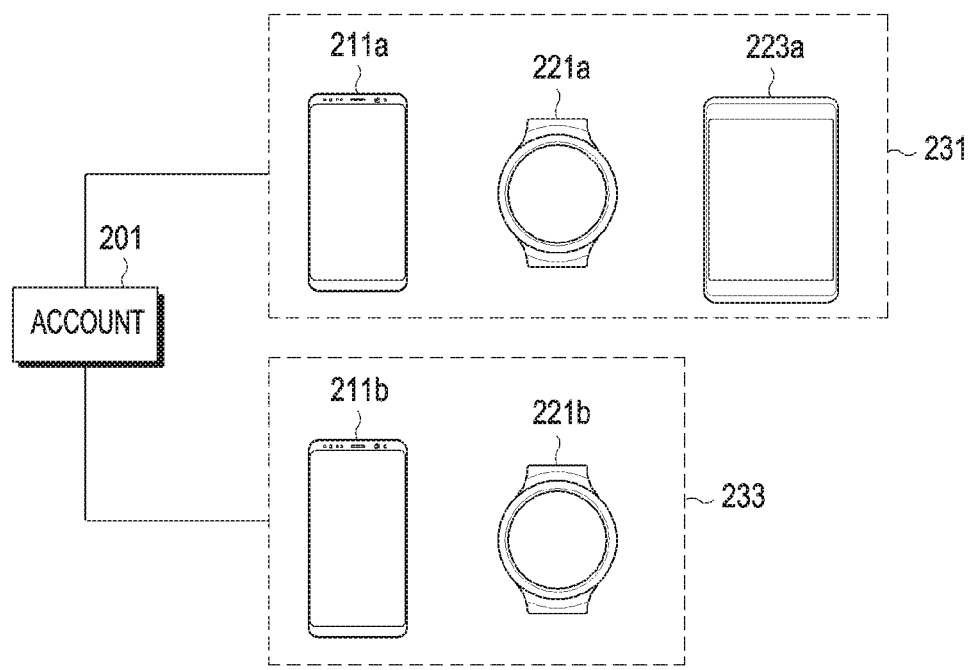
Figure 2C:
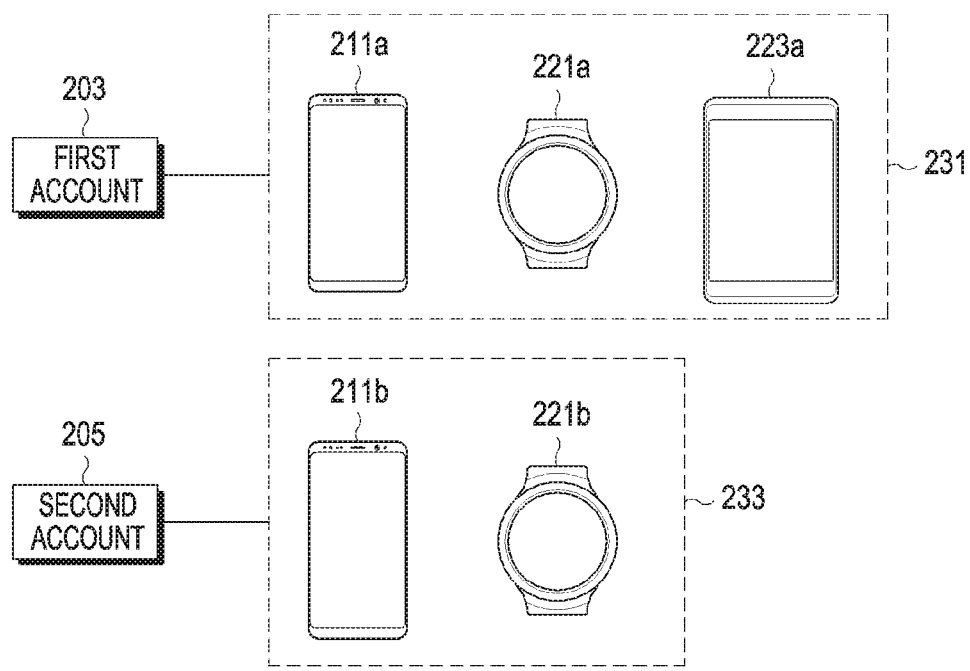

FIGS. 2A, 2B, and 2C are diagrams illustrating an example communication group according to an embodiment.

FIGS. 2A and 2B illustrate an example of setting a communication group based on a phone number.

Referring to FIG. 2A, at least one phone number may be registered for one user account 201, and at least one communication group (e.g., a first communication group 231 or a second communication group 233) may be set corresponding to each phone number.

Each communication group 231 or 233 may include a first electronic device 211 and at least one second electronic device (e.g., a second electronic device_1 221 or a second electronic device_2 223). A communication relaying function may be provided based on the same phone number in the same communication group 231 or 233.

According to an embodiment, when a communication group is set based on a phone number, a communication group 231 corresponding to a first phone number among a plurality of (e.g., two) phone numbers registered in one account 201 is generated and without adding a new account, a new communication group 233 corresponding to two phone numbers may then be added to the same account 201.

For example, when one first electronic device 211 has a plurality of (e.g., two) phone numbers, a plurality of (e.g., two) communication groups 231 and 233 may be set based on each phone number.

Each phone number may be stored in the SIM 211_1 or 211_2 (e.g., a SIM card) in the first electronic device 211. The SIM 211_1 or 211_2 may be the SIM 196 of FIG. 1. The first SIM 211_1 may store the first phone number, and the second SIM 211_2 may store the second phone number.

The communication group 231 or 233 may be set based on each phone number.

The first electronic device 211 and at least one second electronic device (e.g., the second electronic device_1 221 or the second electronic device_2 223) may be registered in each communication group 231 or 233.

When a communication group is set based on a phone number, the communication group 231 or 233 may be used according to the user's desired purpose.

For example, when the user has a business phone number and a personal phone number, the user may register a second electronic device_1 221 (e.g., a smart watch) in the first communication group 231 set based on the business phone number registered in the user's account 201. The user may register the second electronic device_2 223 (e.g., a tablet PC) in the second communication group 233 set based on the personal phone number registered in the account 201. In this example, the second electronic device_1 221 (e.g., a smart watch) may be used for the purpose of taking both personal and business calls, and the second electronic device_2 223 (e.g., a tablet PC) may be used for the purpose of taking personal calls only.

Referring to FIG. 2B, according to an embodiment, when a plurality of (e.g., two) phone numbers are registered in one account 201, a plurality of (e.g., two) communication groups 231 and 233 may be set based on the respective phone numbers of the first electronic devices 211a and 211b for the plurality of (e.g., two) first electronic devices (e.g., first electronic device_1 211a and first electronic device_2 211b) with different phone numbers. The first communication group 231 may be set corresponding to a first phone number. The second communication group 233 may be set corresponding to a second phone number. The first electronic device 211a and at least one second electronic device 221a and/or 223a may be registered in the first communication group 231. The first electronic device 211b and at least one second electronic device 221b may be registered in the second communication group 233.

FIG. 2C illustrates an example of account-based communication group setting.

According to an embodiment, when a communication group is set based on an account, generating a new communication group may require adding a new second account 205 other than the current first account 203. For example, when a particular communication group is managed, account switch (e.g., logout from the first account 203 and login to the second account 205) may be needed.

As shown in FIG. 2C, the first communication group 231 may be registered in the first account 203. First electronic device_1 211a and at least one second electronic device (e.g., second electronic device_1 221a or second electronic device_2 223a) may be registered in the first communication group 231. Upon adding a new communication group, the second communication group 233 may be newly added to the second account 205 after the second account 205 is generated. The first electronic device 211b and at least one second electronic device 221b may be registered in the second communication group 233.

Figure 3:
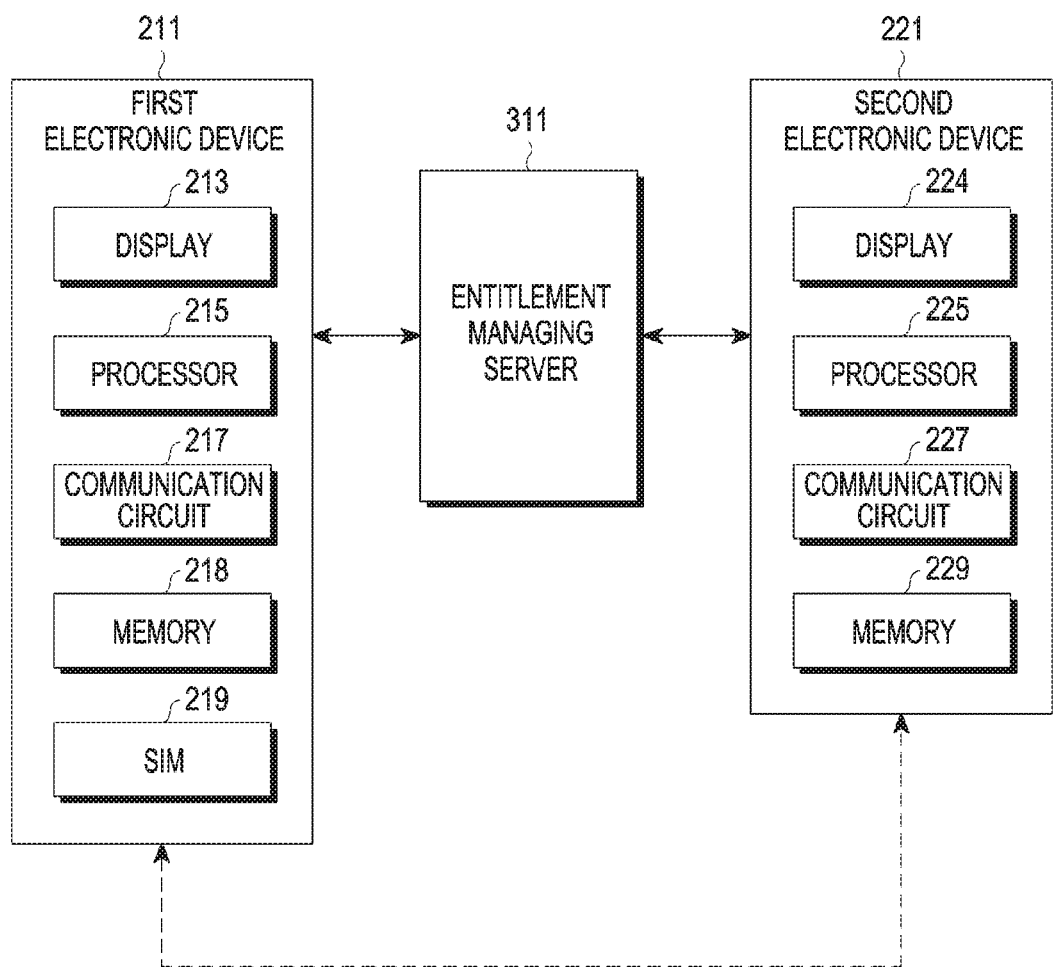
FIG. 3 is a block diagram illustrating an example first electronic device and an example second electronic device according to an embodiment.

FIG. 3 is a block diagram illustrating an example first electronic device and an example second electronic device according to an embodiment.

According to an embodiment, the first electronic device 211 and/or the second electronic device 221 may include the whole or part of the electronic device 101 shown in FIG. 1.

In the example shown in FIG. 3, the first electronic device 211 may directly access a first network (e.g., the second network 199 (e.g., a remote wireless communication network) of FIG. 1) without communication relaying. The first electronic device 211 and the second electronic device 221 may be connected together via the first network (e.g., the second network 199 (e.g., a remote wireless communication network of FIG. 1) or the second network (e.g., the first network 198 (e.g., a short-range wireless communication network) of FIG. 1). For example, the second electronic device 221 may access the first network via the first electronic device 211. As another example, the second electronic device 221 may also access the first network via an external electronic device (e.g., the first electronic device 211 or an access point (AP)) using Wi-Fi.

The first electronic device 211 may include a display 213 (e.g., the display device 160 of FIG. 1), a processor (e.g., including processing circuitry) 215 (e.g., the processor 120 of FIG. 1), a communication circuit 217 (e.g., the communication module 190 of FIG. 1), a memory 218 (e.g., the memory 130 of FIG. 1), and a SIM 219 (e.g., the SIM 196 of FIG. 1).

The second electronic device 221 may include a display 224 (e.g., the display device 160 of FIG. 1), a processor (e.g., including processing circuitry) 225 (e.g., the processor 120 of FIG. 1), a communication circuit 227 (e.g., the communication module 190 of FIG. 1), and a memory 229 (e.g., the memory 130 of FIG. 1).

The first electronic device 211 may include the SIM 219 (e.g., the SIM 196 of FIG. 1). The first electronic device 211 may be a device that may itself access the first network (e.g., the second network 199 (e.g., a remote wireless communication network) of FIG. 1).

According to an embodiment, the second electronic device 221 may be a device that may include no SIM and access the first network via the first electronic device 211. According to an embodiment, the second electronic device 221 may include a SIM (e.g., the SIM 196 of FIG. 1). The second electronic device 221 may be a device that may itself access the first network.

The second electronic device 221 may include a SIM (e.g., the SIM 196 of FIG. 1) using the same phone number as the first electronic device. The second electronic device 221 may include a SIM (e.g., the SIM 196 of FIG. 1) using a different phone number from the first electronic device 211.

When including no SIM, the second electronic device 221 may use the communication relaying service based on short-range wireless communication. Even when the first electronic device 211 and the second electronic device 221 are positioned away from each other off short-range wireless communication coverage, the second electronic device 221 may be connected with the first electronic device 211 via the short-range wireless communication path (e.g., a wireless AP) to use the communication relaying function.

The first electronic device 211 and the second electronic device 221 may access the same second network (e.g., the first network 198 (e.g., a short-range wireless communication network) of FIG. 1). The second electronic device 221 may be connected with the first electronic device 211 via the second network.

The processor 215 of the first electronic device 211 may include various processing circuitry and receive a call through the communication circuit 217 and identify the phone number of the received call. The processor 215 may identify the second electronic device in the communication group (e.g., the first communication group 231 or second communication group 233 of FIGS. 2A, 2B and 2C) set corresponding to the phone number of the received call among at least one phone number registered in the user account. The processor 215 may relay the received call to the identified second electronic device 221 via the communication circuit 217.

The processor 215 of the first electronic device 211 may display a settings screen for setting at least one communication group corresponding to at least one phone number registered in the user account through the display 213. The processor 215 may generate a request for setting (e.g., generating, adding, deleting, or updating a group) at least one communication group according to a user input on the settings screen and transmit the request through the communication circuit 217 to an external electronic device, e.g., an entitlement managing server 311.

According to an embodiment, the entitlement managing server 311 may, for example, and without limitation, generate, add, delete, update, etc. a communication group based on the phone number in response to the request. Each communication group may include the first electronic device 211 and at least one second electronic device 221. A communication relaying function may be provided based on the same phone number in the same communication group. In the same communication group, the phone number of the first electronic device 211 may be used as a group ID. The communication relaying function may be provided per communication group.

According to an embodiment, the second electronic device 221 may include no SIM.

Alternatively, the second electronic device 221 may include a SIM (e.g., the SIM 196 of FIG. 1). The second electronic device 221 may use the same phone number as the first electronic device 211. The second electronic device 221 may use a different phone number from the first electronic device 211. Even when the phone number of the first electronic device differs from the phone number of the second electronic device 221, the phone number of the first electronic device 211 may be registered as a group ID, and the second electronic device 221 may be included in the communication group corresponding to the group ID so that the call received by the first electronic device 211 may be relayed to the second electronic device 221. The memory 229 of the second electronic device 221 may store information about the user account.

The processor 225 of the second electronic device 221 may include various processing circuitry and display a screen for setting whether to activate the communication relaying function on the display 223. The processor 225 may display a screen for selecting at least one phone number registered in the user account on the display 223. As the communication relaying function is activated and one of the at least one phone number is selected, the processor 225 may generate a request for adding or deleting the second electronic device 221 to/from the communication group set corresponding to the selected phone number and transmit the request to the entitlement managing server 311 via the communication circuit 227.

In response to the request, the entitlement managing server 311 may add the second electronic device 221 to the selected communication group or delete the second electronic device 221 from the communication group.

Upon receiving a response to the request through the communication circuit 227, the processor 225 of the second electronic device 221 may display a screen indicating that the second electronic device 221 has been added or deleted to/from the communication group on the display 224.

Figure 4:
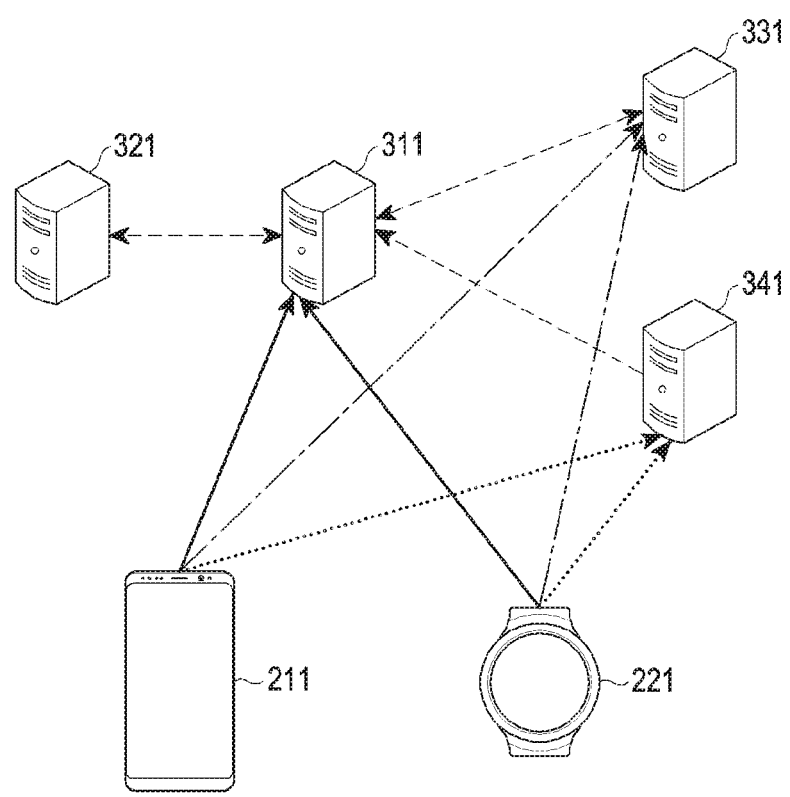
FIG. 4 is a diagram illustrating an example system of providing a communication relaying function according to an embodiment.

FIG. 4 is a diagram illustrating an example system of providing a communication relaying function according to an embodiment.

According to an embodiment, the entitlement managing server 311 may store and manage information (e.g., user information, account information, phone number information, device information, or group information) about each user's communication group and provide information about the communication group.

The first electronic device 211 and/or second electronic device 221 may access the entitlement managing server 311 to identify the information about the communication group and set (e.g., generate, add, delete, or update a group or add or delete a device, etc.) the communication group.

According to an embodiment, the account managing server 321 may store and manage information about the user account (e.g., user ID or account information) and process user authentication.

For example, the user authentication may be performed in interoperation with the entitlement managing server 311. Upon login to the user account, the account managing server 321 may, for example, issue a temporary authentication number (e.g., an access token). The entitlement managing server 311 may receive information about the temporary authentication number and user ID from the user's first electronic device 211 or second electronic device 221 and then send a request for user authentication to the account managing server 321 using the received information. The account managing server 321 may process the user authentication request from the entitlement managing server 311 and provide a response.

According to an embodiment, a configuration managing server 331 may store and manage device configuration information. The device configuration information may be information (e.g., the address of server(s) necessary for providing a communication relaying function) related to the service that the user subscribes to. The configuration managing server 331 may store and/or manage device configuration information (e.g., the group ID (phone number) of each communication group, device ID, group information, and/or device information) per communication group.

According to an embodiment, at the request of the first electronic device 211 or the second electronic device 221, the configuration managing server 331 may identify the communication group information from the entitlement managing server 311 for user authentication.

According to an embodiment, a service server 341 may, for example, provide a communication relaying function and be configured of one or more servers. According to an embodiment, the service server 341 may include a call session control function (CSCF)/telephony application server (TAS) to provide a call forking function. According to an embodiment, the service server 341 may include an IP multimedia core network subsystem (IMS) server to support media calls when the call forking function is provided. According to an embodiment, the service server 341 may include a sync server to provide a message sync function or phone call log sync function. As an example, the CSCF server may logically operate as a proxy call session control function (P-CSCF) server, an interrogating call session control function (I-CSCF) server, or a serving call session control function (S-CSCF) server. The P-CSCF server may operate as a contact with the electronic device 211 or 221 over the IMS network and may proxy the session initiation protocol (SIP) message. The P-CSCF server may provide such functions as security or compression in interoperation with the electronic device 211 or 221.

The I-CSCF server may operate as a contact over the IMS network to provide a call forking service and play a role to route the SIM message to another node over the IMS network. The IMS network may be intended for a call relaying service. The IMS network may be a network including part of the first network (e.g., the second network 199 (e.g., a remote wireless communication network) of FIG. 1) or one or more servers (e.g., the server 108 of FIG. 1) connectable thereto.

The S-CSCF server may manage the session status for the SIM message. The S-CSCF server may execute call control necessary for providing the service the subscriber has requested via routing to the TAS. The S-CSCF server may play a role as a SIP register to process a device registration request from the electronic device 211 or 221 and manage the device registration status.

According to an embodiment, the TAS server may provide an IMS-based multimedia communication service. The TAS server may support IMS-based media calls and provide a call forking function according to an embodiment.

As an example, in the IMS network, the IMS public user ID (IMPU) may be used as a user ID to identify the user.

According to an embodiment, the service server 341 may identify communication group information from the entitlement managing server 311. For example, when the first electronic device 211 and/or the second electronic device 221 sends a request for device registration for a call forking service to the service server 341, the service server 341 may identify whether the device or communication group having sent the request has been registered in the entitlement managing server 311 and may then perform authentication via the account managing server 321. As another example, when the first electronic device 211 and/or second electronic device 221 transmits a sync (e.g., an HTTP request) for a sync service to the service server 341, the service server 341 may identify whether the device or communication group having sent the request has been registered in the server 311 and may then perform authentication via the account managing server 321.

According to an embodiment, the entitlement managing server 311 may identify per-communication group device configuration information from the configuration managing server 331. The entitlement managing server 311 may identify information (e.g., the address of server(s) necessary for providing a communication relaying function) related to the service that the user subscribes to from the service server 341.

According to an embodiment, the first electronic device 221 and/or the second electronic device 221 may identify device configuration information from the configuration managing server 331 and interwork with the service server 341 based on the device configuration information to thereby use a communication relaying function (e.g., call forking function).

The first electronic device 211 and/or second electronic device 221 may identify the user's communication group information from the entitlement managing server 311 and interwork with the service server 341 based on the communication group information to thereby use a communication relaying function (e.g., call forking function).

Figure 5A:
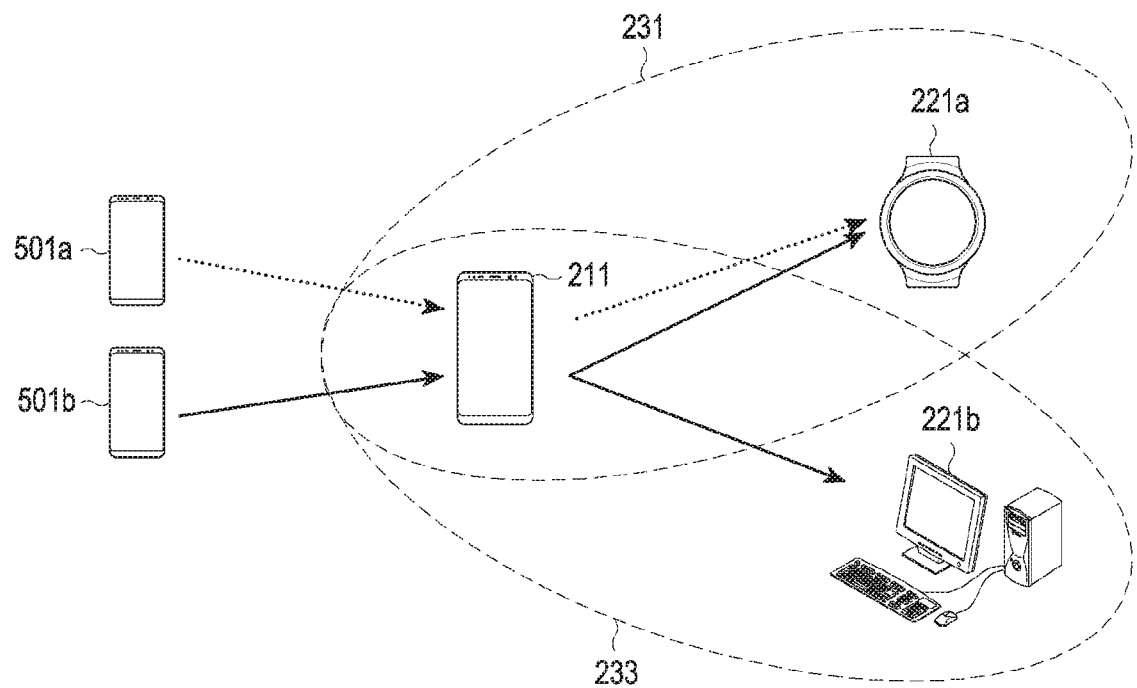
FIGS. 5A and 5B are diagrams illustrating an example call forking scenario of a communication relaying function according to an embodiment.
Figure 5B:
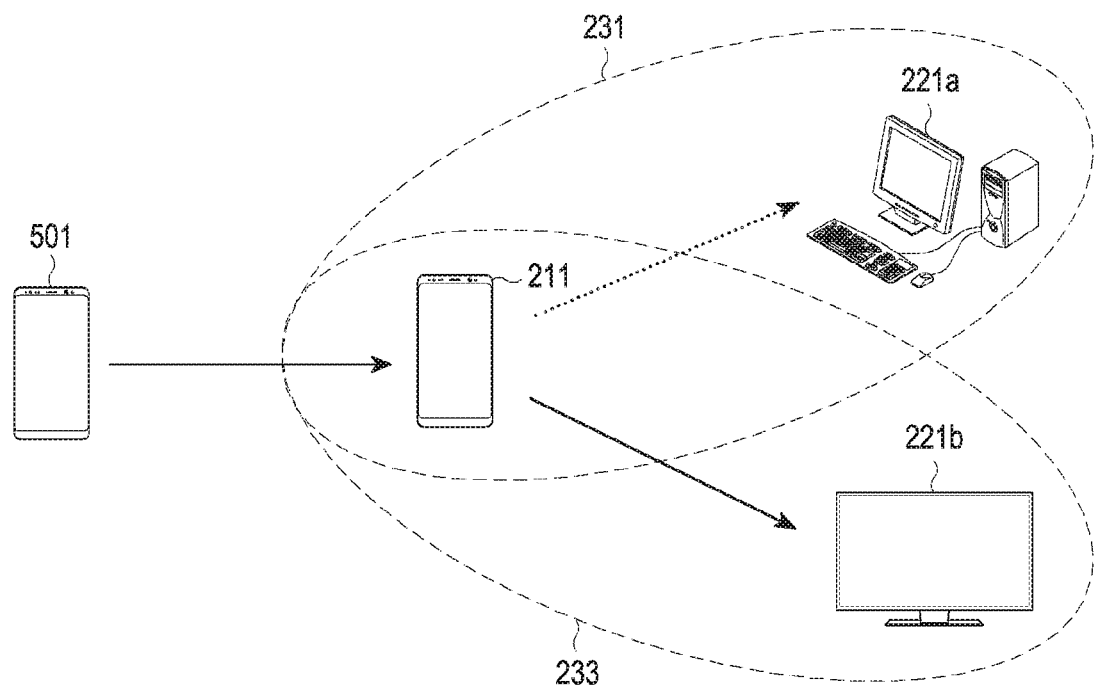

FIGS. 5A and 5B are diagrams illustrating an example call forking scenario of a communication relaying function according to an embodiment.

FIG. 5A illustrates an example call forking scenario using a SIM (e.g., SIM card)-based group ID (phone number).

When the first electronic device 211 (e.g., a smartphone) has two phone numbers (e.g., one business phone number and one personal phone number), second electronic device_1 221a (e.g., a smart watch) may be used for the purpose of taking both personal calls and business calls, and second electronic device_2 221b (e.g., a computer) may be used for the purpose of taking business calls only.

A grouping operation (generating a group) is described below as an example.

The first electronic device 211 may request an entitlement managing server (e.g., the entitlement managing server 311 of FIG. 3) to generate a group based on the personal phone number, generating a first communication group 231. The first electronic device 211 may request the entitlement managing server 311 to generate a group based on the business phone number, generating a second communication group (e.g., the second communication group 233 of FIG. 2A).

Second electronic device_1 221a (e.g., a smart watch) may add a device to the first communication group 231. For example, second electronic device_1 221a (e.g., a smart watch) may transmit an add device request including the user ID, the group ID (phone number) corresponding to the first communication group, its own device ID, and/or authentication information to the entitlement managing server 311, thereby proceeding to add a device to the first communication group. Adding second electronic device_1 221a to the first communication group 231 may be performed by the first electronic device 211. The first communication group 231 may include the first electronic device 211 and second electronic device_1 221a.

Second electronic device_1 221a and second electronic device_2 221b each may proceed to add device to the second communication group 233. The second communication group 233 may include the first electronic device 211, second electronic device_1 221a, or second electronic device_2 221b.

An example call forking operation is described below, with the first communication group 231 and the second communication group 233 set up.

Calls at the personal phone number from an external electronic device 501a may be forwarded only to second electronic device_1 221a belonging to the first communication group 231. Calls at the business phone number from an external electronic device 501b may be forwarded both to second electronic device_1 221a and second electronic device_2 221b belonging to the second communication group 233.

FIG. 5B illustrates an example call forking scenario using a location-based group ID.

When the first electronic device 211 (e.g., a smartphone) registers two communication groups depending on the location (e.g., home and workplace), second electronic device_1 221a (e.g., a workplace computer) may be used for the purpose of taking calls at the workplace, and second electronic device_2 221b (e.g., a smart TV) may be used for the purpose of taking calls at home.

A grouping operation (generating a group) is described below as an example.

The first electronic device 211 may request the entitlement managing server 311 to generate a group based on the workplace location, generating a first communication group 231. The first electronic device 211 may request the entitlement managing server 311 to generate a group based on the home location, generating a second communication group 233. Second electronic device_1 221a (e.g., a smart watch) may add a device to the first communication group 231. The first communication group 231 may include the first electronic device 211 and second electronic device_1 221a.

Second electronic device_2 221b may proceed to add a device to the second communication group 233. The second communication group 233 may include the first electronic device 211 and second electronic device_2 221b.

According to an embodiment, at the request of adding a group, a communication group may be automatically selected based on the location of second electronic device_1 221a or second electronic device_2 221b, and second electronic device_1 221a or second electronic device_2 221b may be added to the selected communication group. For example, when second electronic device_2 221b is located at home, the second communication group 233 which corresponds to the home location may be automatically selected so that second electronic device_2 221b may be added to the second communication group 233. As another example, when second electronic device_2 221b is located at the workplace, the first communication group 231 which corresponds to the workplace location may automatically be selected so that second electronic device_2 221b may be added to the first communication group 231.

An example call forking operation is described below, with the first communication group 231 and the second communication group 233 set up.

When the first electronic device 211 receives a call from, for example, external device 501, while the location of the first electronic device 211 is designated as workplace, the call may be forwarded to second electronic device_1 221a registered in the first communication group 231.

When the first electronic device 211 receives a call while the location of the first electronic device 211 is designated as home, the call may be forwarded to second electronic device_2 221b registered in the second communication group 233.

Figure 6:
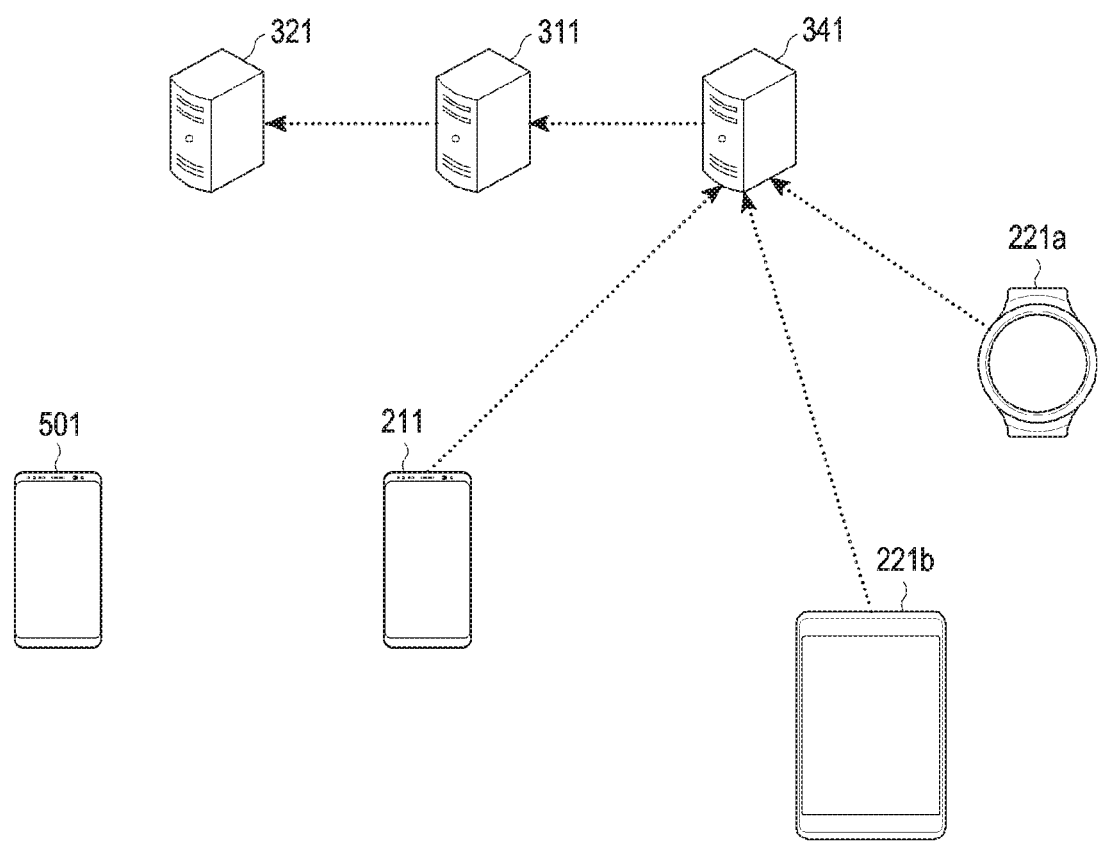
FIGS. 6 and 7 are diagrams illustrating an example call forking scenario of a communication relaying function according to an embodiment.
Figure 7:
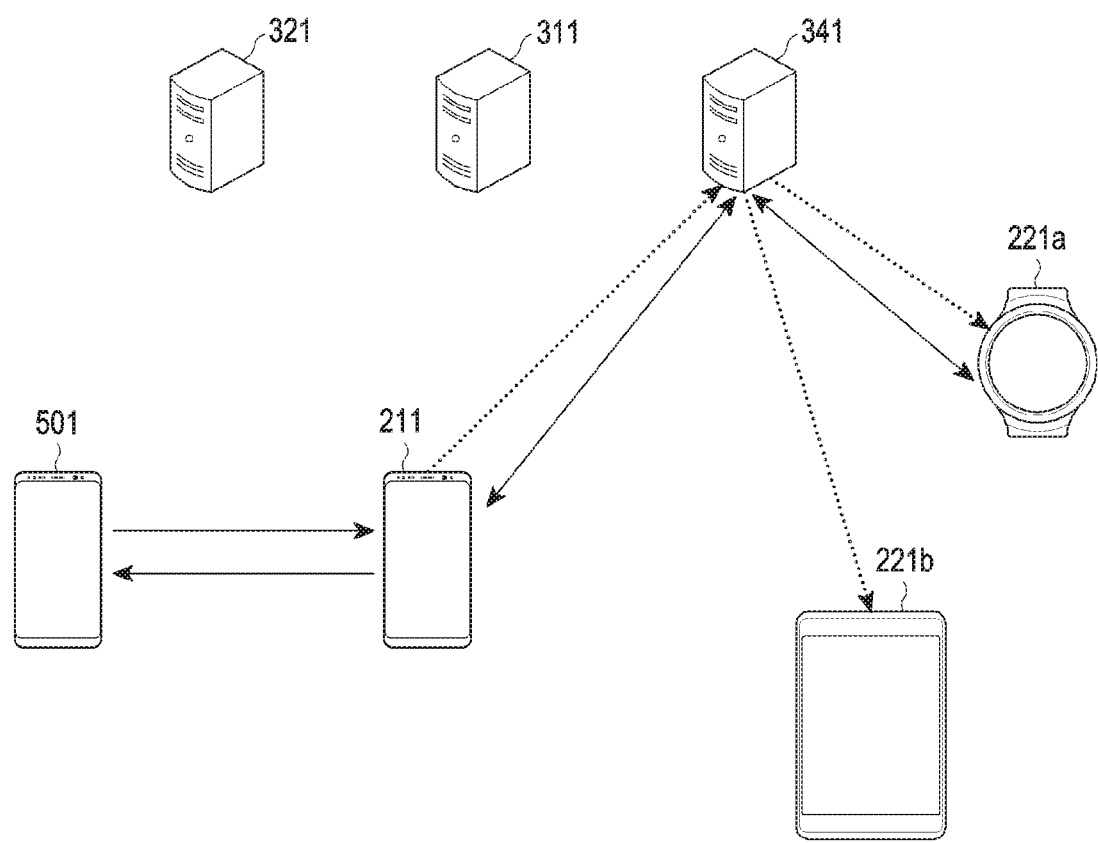

FIGS. 6 and 7 are diagrams illustrating an example call forking scenario of a communication relaying function according to an embodiment.

In the example shown in FIG. 6, two communication groups are set corresponding to two phone numbers (e.g., 821011111111 and 821022222222) for the first electronic device 211, and second electronic device_1 221a is added to the first communication group (whose group ID is, e.g., 821011111111) and second electronic device_2 221b is added to the second communication group (whose group ID is, e.g., 821022222222).

According to an embodiment, the first electronic device 211, second electronic device_1 221a, and second electronic device_2 221b may send a request for device registration to the service server 341 (e.g., an IMS server) for using the call forking function.

According to an embodiment, the service server 341 may access the entitlement managing server 311 to request to identify user information. The entitlement managing server 311 may access the entitlement managing server 311 to request to authenticate the user who has sent the device registration request.

When the user is a valid user, device registration information about a new device, e.g., the first electronic device 211, second electronic device_1 221a, or second electronic device_2 221b, may be stored in the service server 341 supporting the call forking function, so that device registration may be performed. The device registration information may include, e.g., user ID, device IDs, and/or the group IDs corresponding to each device.

In the example shown in FIG. 7, the service server 341 may be an IMS server or CSCF/TAS server supporting the call forking function.

According to an embodiment, the IMS server or CSCF/TAS server may be included in the IMS network. For example, the external electronic device 501 and the first electronic device 211 may communicate with each other via a mobile network operator (MNO) network (cellular network), and the electronic devices 211, 221a, and 221b in the communication group may communicate with each other via an IMS network. For example, the MNO network may be intended for a basic call service, and the IMS network may be intended for a call relaying service. The MNO network or IMS network may be a network including part of the first network (e.g., the second network 199 (e.g., a remote wireless communication network) of FIG. 1) or one or more servers (e.g., the server 108 of FIG. 1) connectable thereto.

The external electronic device 501 may attempt to call the first electronic device 211 via a network (e.g., the MNO network).

The first electronic device 211 may attempt to call the communication group using the phone number of the call as its group ID.

When second electronic device_1 221a receives the call, a call between the external electronic device 501 and the first electronic device 211 and a call between the first electronic device 211 and the second electronic device 221 may be generated.

In this case, a call session may be established between the first electronic device 211 and second electronic device_1 221a which pass through the service server 341, and a call connection may be formed between the external electronic device 501 and second electronic device_1 221a via the call session. The first electronic device 211 may relay the call between the external electronic device 501 and second electronic device_1 221a and transmit and receive media via the call session.

The first electronic device 211 may transfer media received from the external electronic device 501 through the network to second electronic device_1 221a via the service server 341 (e.g., an IMS server or CSCF/TAS server).

The first electronic device 211 may transfer the media received from second electronic device_1 221a through the service server 341 to the external electronic device 501 via a second network (e.g., an IMS network or a Wi-Fi network where both the first electronic device 211 and second electronic device_1 221a are connected).

Figure 8A:
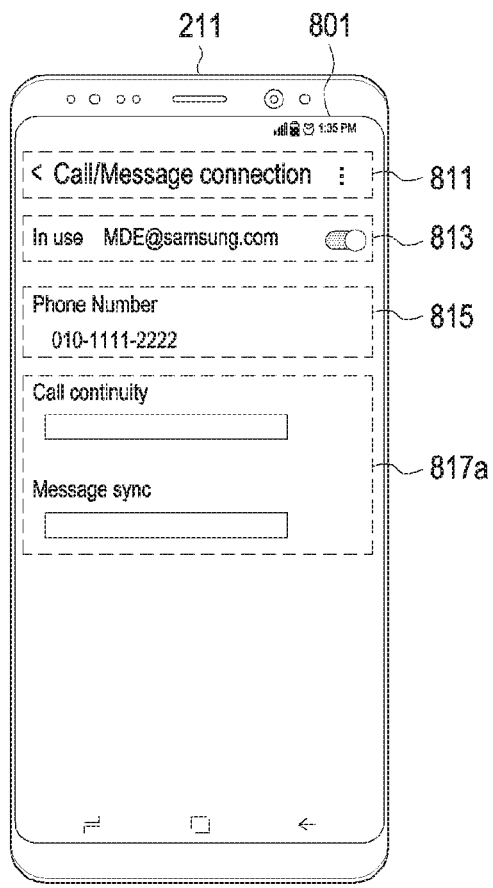
FIGS. 8A and 8B are diagrams illustrating example screens of a first electronic device according to an embodiment.
Figure 8B:
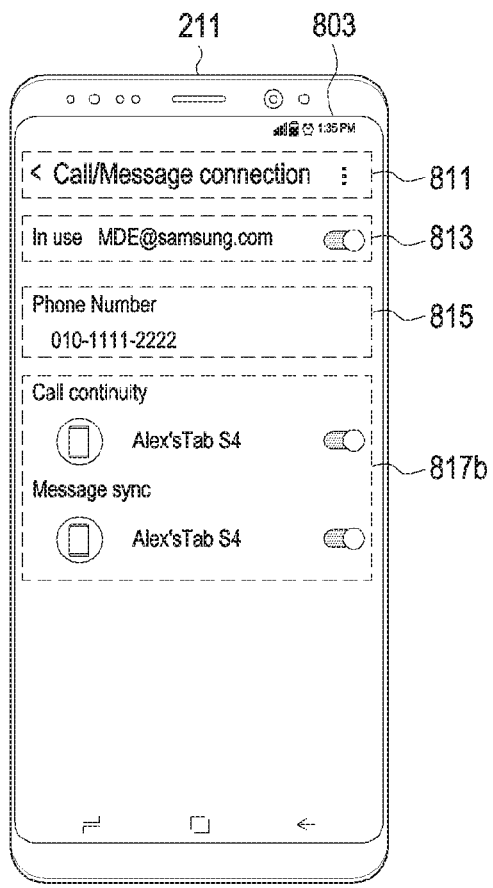

FIGS. 8A and 8B are diagrams illustrating example screens of a first electronic device according to an embodiment.

The first electronic device 211 may display a settings screen 801 or 803 for a communication relaying function.

The settings screen 801 or 803 of the first electronic device 211 may include at least one of areas for generating, adding, updating, or deleting a communication group. Referring to FIGS. 8A and 8B, the settings screen 801 or 803 may include a first area 811 to indicate that the screen is intended for setting the communication relaying function, a second area 813 for setting whether to activate the communication relaying function of the first electronic device 211, a third area 815 for displaying the phone number of the communication group, and a fourth area 817a or 817b for displaying the devices included in the communication group and setting whether to activate the communication relaying function of the communication group.

The settings screen 801 of FIG. 8A may, for example, be a user experience (UX) for adding groups. The settings screen 801 may indicate a UX before a device is added. For example, as an application for setting the communication relaying function is executed and the communication relaying function of the first electronic device 211 is activated, the settings screen as denoted with 801 may be displayed.

The first area 811 may be an area indicating that the current screen is a screen for setting the communication relaying function.

The second area 813 may be an area for setting whether to activate the communication relaying function of the first electronic device 211.

The third area 815 may be an area for displaying at least one phone number registered in the user account of the first electronic device 211. Each phone number may be used as a group ID.

According to an embodiment, when the first electronic device 211 has one phone number, as the communication relaying function is activated, the communication group using the phone number as its group ID may be automatically set (e.g., newly generate d) without a separate user input for selecting a group. The first electronic device 211 may be registered as the primary device of the communication group.

According to an embodiment, when a plurality of (e.g., two) phone numbers are registered in the user account of the first electronic device 211, the plurality of phone numbers may be displayed on the third area 815, and a menu (not shown) (e.g., a setting button next to each phone number) for selecting each phone number may be displayed. When a particular phone number is selected, for example, by a user input, the communication group using the selected phone number as its group ID may be set (e.g., newly generated or added).

The fourth area 817a may be an area indicating the status of the communication group. As the communication relaying function is activated, the status of the current communication group may be displayed on the fourth area 817a (e.g., no device connected). The settings screen 803 of FIG. 8B may, for example, be a UX after a device is added to the communication group in the first electronic device 211. As the second electronic device 221 (e.g., Alex's Tab S4) is added to the set communication group, the settings screen 803 may be displayed.

As an example, as a push message to indicate the add device event is delivered to the first electronic device 211, and the application for setting the communication relaying function is executed on the first electronic device 211, a settings screen such as the settings screen 803 may be displayed.

The fourth area 817b may be an area indicating the status of the communication group. As an add device event occurs, the status of the current communication group may be updated from the fourth area 817a of FIG. 8A to the fourth area 817b (e.g., the state where Alex's Tab S4 has been added) of FIG. 8B. For example, the fourth area 817b of FIG. 8B may be a screen in the state where the second electronic device 221, e.g., Alex's Tab S4, is included in the communication group set corresponding to phone number 010-1111-2222.

Device information (e.g., Alex's Tab S4) about each device included in the communication group may be displayed on the area. A menu (e.g., an activate button next to Alex's Tab S4) for setting whether to activate each subfunction (e.g., call continuity (call forking) or message sync) of the communication relaying function for each device may be displayed on the area. Only some of the communication relaying functions (e.g., call continuity (call forking)) may be activated for one device according to a user input.

Figure 8C:
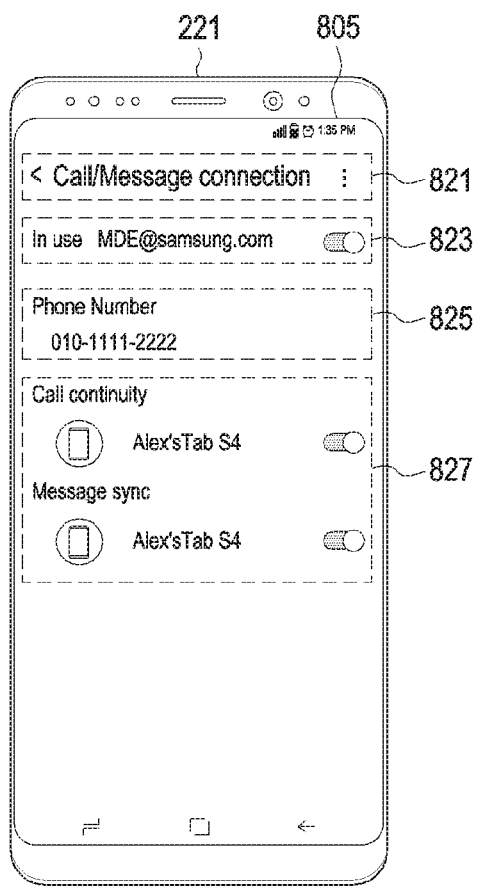
FIG. 8C is a diagram illustrating an example screen of a second electronic device according to an embodiment.

FIG. 8C is a diagram illustrating an example screen of a second electronic device according to an embodiment.

The second electronic device 221 may display a settings screen 805 for the communication relaying function.

The settings screen 805 may include at least one of an area for adding the second electronic device 221 to a set communication group or an area for deleting the second electronic device 221 from the set communication group.

FIG. 8C may illustrate an example UX for adding devices. Adding a new device for the communication group set for a phone number may be performed on the settings screen 805. For example, the second electronic device 221 itself may add a device.

The first area 821 may be an area indicating that the current screen is a screen for setting the communication relaying function.

The second area 823 may be an area for setting whether to activate the communication relaying function of the second electronic device 221.

The third area 825 may be an area for displaying at least one phone number registered in the user account of the second electronic device 221.

The fourth area 827 may be an area indicating the status of the communication group.

For example, as the application for setting the communication relaying function is executed, and the user activates the communication relaying function of the second electronic device 221, the second electronic device 221 may display the status of the current communication group on the fourth area 827.

According to an embodiment, as the communication relaying function is activated, the status of the current communication group may be displayed on the fourth area 827. For example, the fourth area 827 may be a screen in the state where the second electronic device 221 itself is included in the communication group set corresponding to phone number 010-1111-2222.

Device information (e.g., Alex's Tab S4) about the second electronic device 221 may be displayed on the fourth area 827. A menu (e.g., an activate button next to Alex's Tab S4) for setting whether the second electronic device 221 activates each subfunction (e.g., call continuity (call forking) or message sync) of the communication relaying function for each device may be displayed on the fourth area 827. Only part (e.g., one of call forking or message sync) of the communication relaying function may be activated on the second electronic device 221 according to a user input.

Figure 9A:
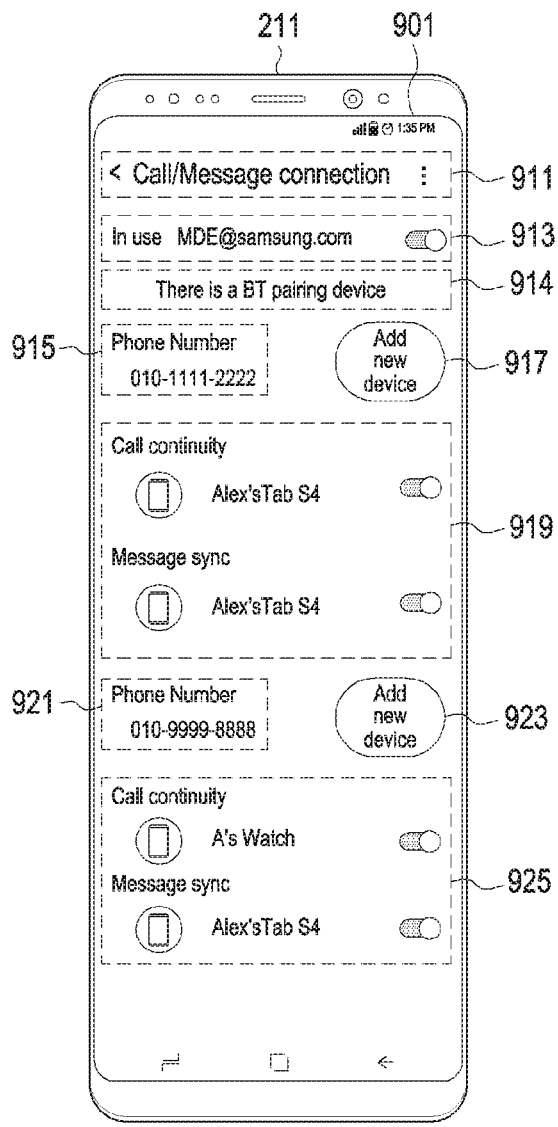
FIGS. 9A and 9B are diagrams illustrating example screens of a first electronic device according to an embodiment.
Figure 9B:
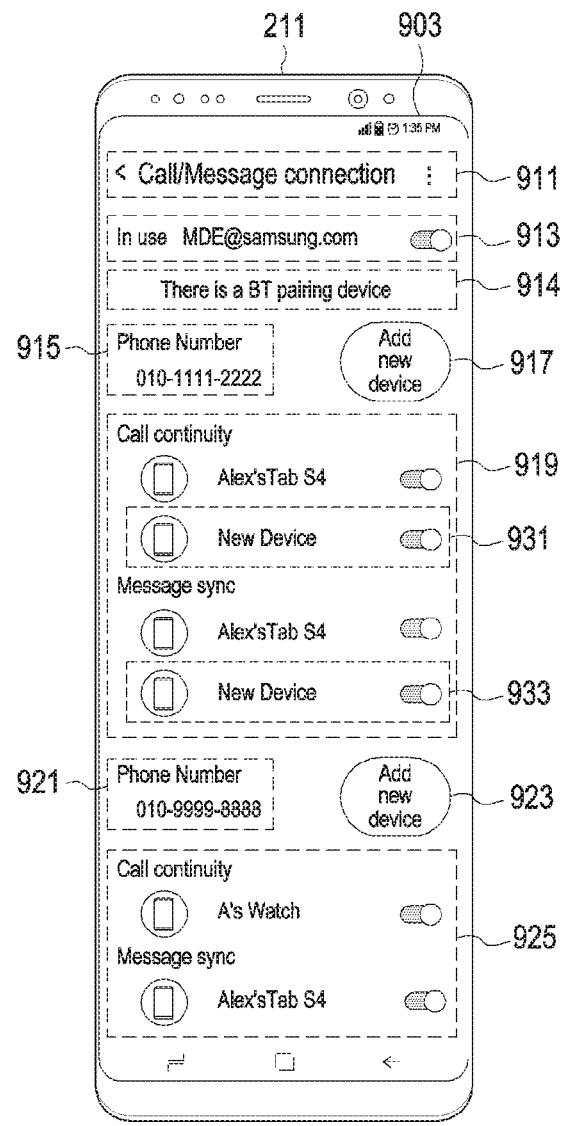

FIGS. 9A and 9B are diagrams illustrating example screens of a first electronic device according to an embodiment.

The settings screen 901 or 903 of the first electronic device 211 may include an area to add the second electronic device 221 to a set communication group or an area to delete the second electronic device 221 from the set communication group.

The settings screens 901 and 903 of FIGS. 9A and 9B may, for example, be a UX for adding devices. The second electronic device 221 may proceed to add a device to register the second electronic device 221 in the communication group.

The first area 911 may be an area indicating that the current screen is a screen for setting the communication relaying function. Information (e.g., call/message connection) about the application currently running for the communication relaying service may be displayed on the first area 911.

The second area 913 may be an area for setting whether to activate the communication relaying function of the first electronic device 211. A menu (e.g., an activate button) for selecting whether to activate the communication relaying function may be displayed on the second area 913.

The third area 914 may be an area to indicate that there is a device connected (e.g., Bluetooth paired) with the first electronic device 211.

The fourth area 915 and the fifth area 921 may be areas to display the first phone number and the second phone number, respectively, of the first electronic device 211. The first phone number may be used as the group ID of the first communication group. The second phone number may be used as the group ID of the second communication group. The sixth area 917 and the seventh area 923 may be areas to add a device to each communication group. An add device menu (e.g., a button) may be displayed on each of the sixth area 917 and the seventh area 923. The eighth area 919 and the ninth area 925 may be areas to add a device to each communication group.

The eighth area 919 and the ninth area 925 may be areas to indicate whether the second electronic device 221 has been added to each communication group or to display device information (e.g., Alex's Tab S4, A's watch) about the second electronic device 221 included in each communication group.

The eighth area 919 may be an area to indicate the status of the first communication group set corresponding to the first phone number. The eighth area 919 may display device information (e.g., Alex's Tab S4) about the device included in the first communication group. The eighth area 919 may display a menu (e.g., an activate button next to Alex's Tab S4) for selecting whether to activate a function for each device belonging to the first communication group. The eighth area 919 may display a menu for setting whether to activate each subfunction (e.g., call continuity or message sync) of the communication relaying function. The ninth area 925 may be an area to indicate the status of the second communication group set corresponding to the second phone number. The ninth area 925 may display device information (e.g., A's watch) about the device included in the second communication group. The ninth area 925 may display a menu (e.g., an activate button next to Alex's Tab S4 or A's watch) for selecting whether to activate a function for each device belonging to the second communication group. The ninth area 925 may display a menu (e.g., an activate button next to Alex's Tab S4 or A's watch) for setting whether to activate each subfunction of the communication relaying function for each device belonging to the second communication group.

For example, as the application for the communication relaying function is executed, the first electronic device 211 may identify whether there is a device Bluetooth-paired with the first electronic device 211.

When there is identified to be a device Bluetooth paired, the existence of the device currently paired may be displayed on the screen of the first electronic device 211 as denoted with the third area 914.

The first electronic device 211 may obtain information about the current communication group (information about the devices and the communication group currently registered) from the entitlement managing server 311 and display as denoted with the eighth area 919 or the ninth area 925.

The paired device may be added by the user to the selected communication group. To that end, an add device button may be displayed next to the communication group where the device does not belong or the device in the communication group as denoted with the sixth area 917 or the seventh area 923. No add device button may be displayed in the communication group which already has the device.

The user may select the communication group to which he or she desires to connect the device. As the user selects the add device button in the sixth area 917 or seventh area 923, an add device procedure may be performed to add the device to the first or second communication group.

When the paired device is added by the user to the selected communication group, information about the communication group adding the new device may be updated and displayed in the eighth area 919 or ninth area 925.

The eighth area 919 or ninth area 925 of FIG. 9A, which displays the communication group information, may be updated as a new device is added or an existing device is deleted.

FIG. 9B illustrates an example in which the paired device is newly added to the first communication group.

As a new device (e.g., New Device) is added to the first communication group, the eighth area 919 displaying the information about the first communication group may be updated as shown in FIG. 9B. As the eighth area 919 displaying the status of the first communication group is updated, additional areas 931 and 933 to display device information about the newly added device may be displayed.

As shown in FIG. 9B, each communication group may include one or more devices (e.g., Alex's Tab S4 of the first communication group corresponding to the first phone number 010-1111-2222 or A's watch and Alex's Tab S4 of the second communication group corresponding to the second phone number 010-9999-8888).

One device may belong to different communication groups (e.g., Alex's Tab S4 may belong to each of the first communication group and the second communication group).

Whether to activate each subfunction of the communication relaying function may be set for each device (e.g., in the second communication group, only call continuity is activated for A's watch, and only message sync is activated for Alex's Tab S4). According to an embodiment, the settings screens 901 and 903 of FIGS. 9A and 9B may be utilized as a UX for deleting devices.

For example, when the first communication group corresponding to the first phone number (e.g., 010-1111-2222) and the second communication group corresponding to the second phone number (e.g., 010-9999-8888) are set as shown in FIG. 9A or 9B, information about the first communication group may be displayed in the eighth area 919, and information about the second communication group may be displayed in the ninth area 925.

When the whole communication relaying function (e.g., call continuity and message sync) of a particular device (e.g., Alex's Tab S4) is set to be deactivated in the eighth area 919 displaying the status of the first communication group and the ninth area 925 displaying the status of the second communication group, the device (e.g., Alex's Tab S4) may be deleted from the current communication group (e.g., the first communication group and the second communication group). For example, when all of the three activate buttons next to Alex's Tab S4 are deactivated in the eighth area 919 and the ninth area 925, Alex's Tab S4 may be deleted from the first communication group and the second communication group. As another example, when one activate button next to A's watch is deactivated in the ninth area 925, A's watch may be deleted from the second communication group.

According to an embodiment, the UX for deleting devices may be implemented separately from the UX for adding devices (e.g., a UX including a delete device button).

Figure 10A:
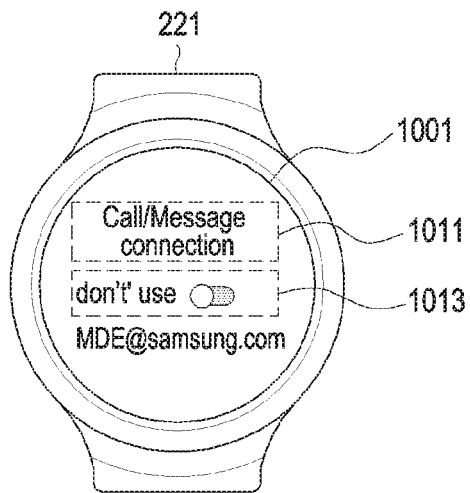
FIGS. 10A, 10B, and 10C are diagrams illustrating example screens of a second electronic device according to an embodiment.
Figure 10B:
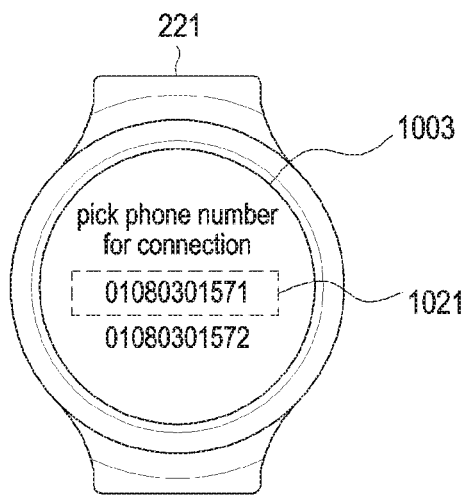
Figure 10C:
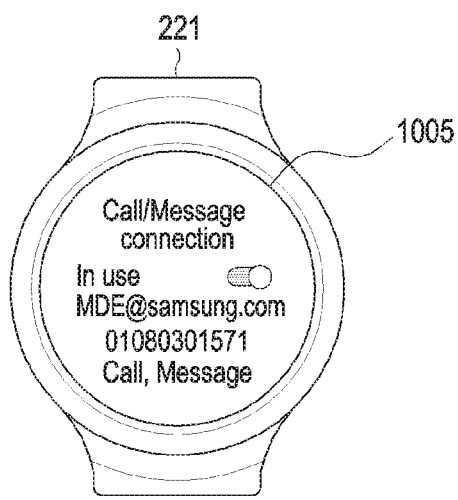

FIGS. 10A, 10B, and 10C are diagrams illustrating example screens of a second electronic device according to an embodiment.

The second electronic device 221 may display settings screens 1001, 1003, and 1005 for a communication relaying function.

Referring to FIG. 10A, the settings screen 1001 may be a screen for setting whether to activate the communication relaying function (e.g., a screen in an inactive service state).

The first area 1011 may be an area indicating that the current screen is a screen for setting the communication relaying function.

The second area 1013 may be an area for setting whether to activate the communication relaying function of the second electronic device 221.

Referring to FIG. 10B, the settings screen 1003 may be a screen for selecting at least one phone number registered in the user account of the second electronic device 221. According to an embodiment, a plurality of phone numbers registered in the user account may be displayed to select one phone number. The selected phone number may be used as the group ID of a particular communication group.

The first area 1021 may be an area to display at least one phone number at which the second electronic device 221 is connectable.

As the communication relaying function is activated on the settings screen 1001 of FIG. 10A and one of at least one phone number is selected on the settings screen 1003 of FIG. 10B, the second electronic device 221 may send a request for adding or deleting the second electronic device 221 to/from the communication group set corresponding to the selected phone number to the account managing server (e.g., the account managing server 321 of FIG. 4).

The account managing server 321 may proceed to add or delete a device to/from the communication group corresponding to the selected phone number according to the request and transmit a response thereto to the second electronic device 221.

Upon receiving the response, the second electronic device 221 may display a screen indicating that the second electronic device 221 has been added to or deleted from the communication group on the settings screen 1005 of FIG. 10C (a screen in the active service state).

Figure 11:
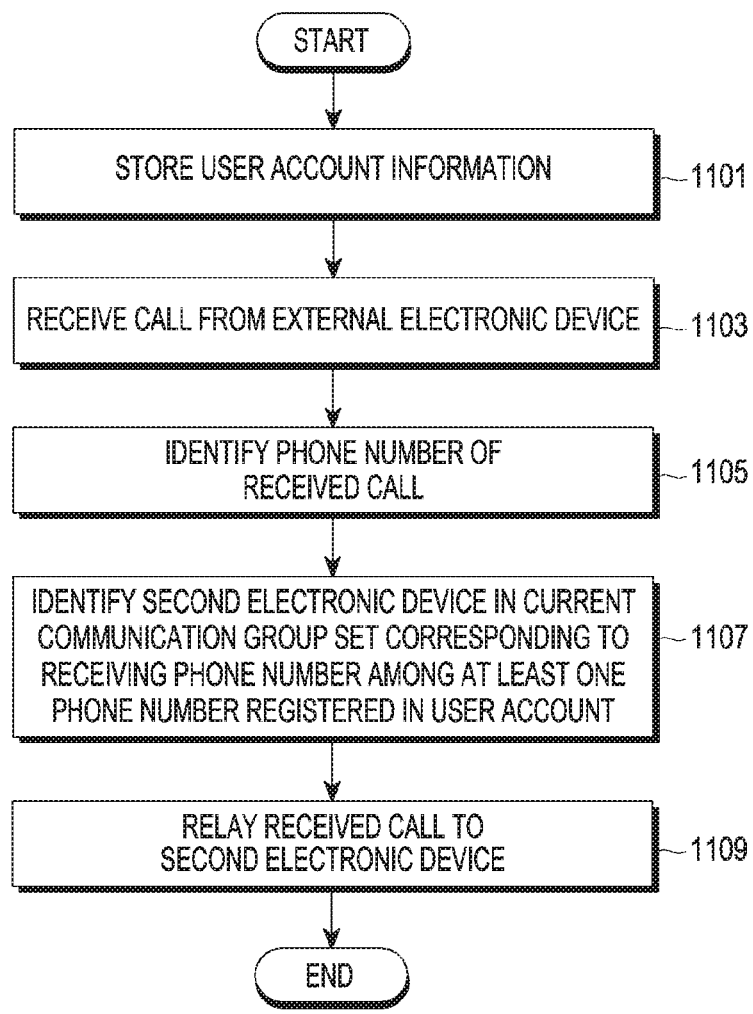
FIG. 11 is a flowchart illustrating an example communication relaying method according to an embodiment.

FIG. 11 is a flowchart illustrating an example communication relaying method according to an embodiment. The communication relaying method of FIG. 11 may be performed, for example, by the first electronic device 211.

In operation 1101, the first electronic device 211 may store user account information.

In operation 1103, the first electronic device 211 may receive a call from an external electronic device 501.

In operation 1105, the first electronic device 211 may identify the phone number of the received call.

In operation 1107, the first electronic device 211 may identify the second electronic device 221 in the current communication group set corresponding to the receiving phone number among at least one phone number registered in the user account.

In operation 1109, the first electronic device 211 may relay the received call to the identified second electronic device 221, thereby providing a communication relaying function for the second electronic device 221.

As the identified second electronic device 221 receives the call relayed by the first electronic device 211, the first electronic device 211 may produce a call session between the first electronic device 211 and the second electronic device 221 which pass through the second external electronic device (e.g., the service server 341, IMS server, or CSCF/TAS server) and connects the call between the external electronic device (e.g., the service server 341) and the second electronic device 221 via the produced call session.

Upon relaying the call, the first electronic device 211 may transmit a call connection request including the user ID, group ID, device ID, or authentication information to the second external electronic device (e.g., the configuration managing server 331), receive device configuration information from the second external electronic device (e.g., the configuration managing server 331) in response to the call connection request, and relay the call to the second electronic device 221 included in the current communication group based on the received device configuration information.

Figure 12A:
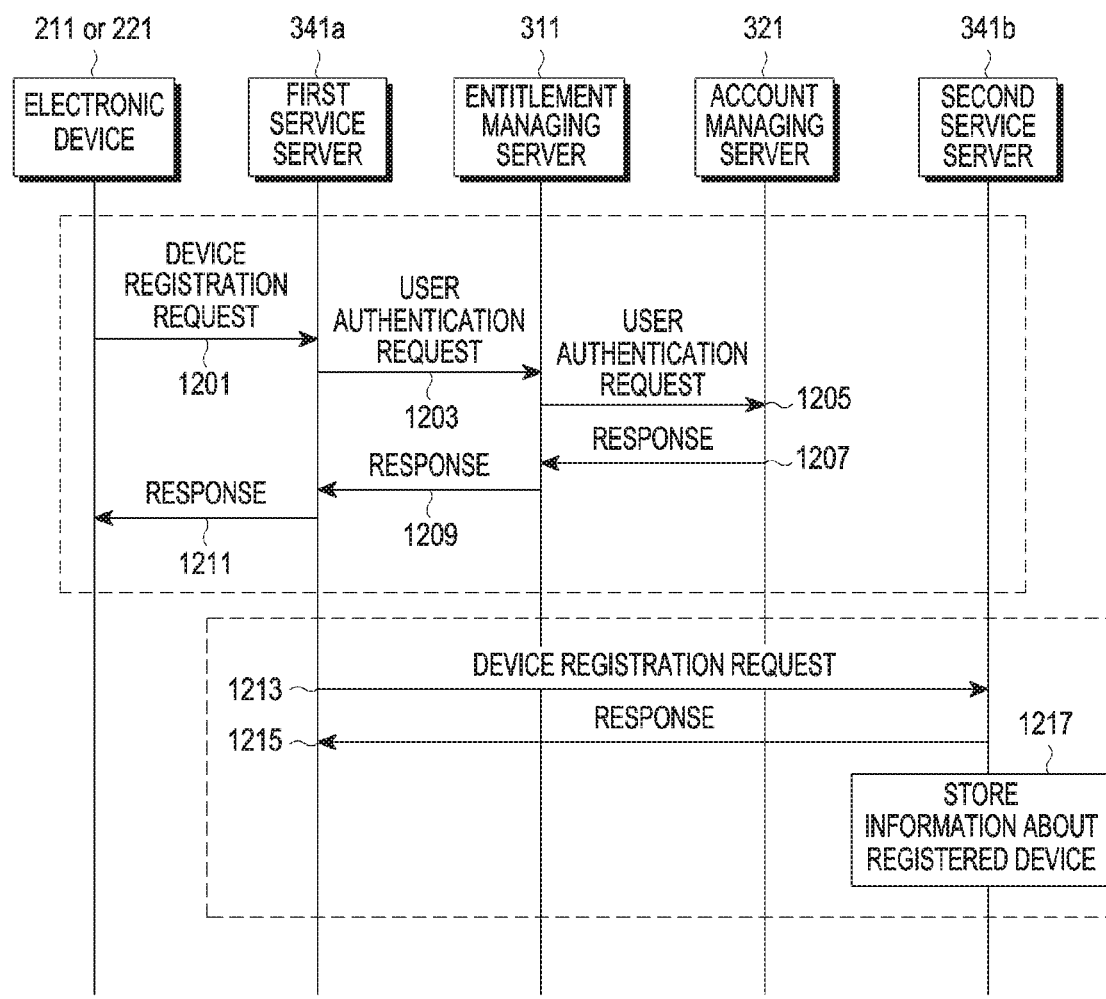
FIG. 12A is a sequence diagram illustrating an example device registration operation for call forking of a communication relaying method according to an embodiment.

FIG. 12A is a sequence diagram illustrating an example device registration operation for call forking of a communication relaying method according to an embodiment.

Operations 1201 to 1211 may, for example, be a user authentication procedure.

In operation 1201, an electronic device 211 or 221 may transmit a device registration request to a first service server 341a (e.g., a CSCF server). The device registration request may include the user ID, group ID, device ID, or temporary authentication number (e.g., an access token).

In operation 1203, the first service server 341a may transmit a user authentication request for identifying whether the user is a valid user to the entitlement managing server 311. The user authentication request may include the user ID, group ID, device ID, or temporary authentication number (e.g., an access token).

In operation 1205, the entitlement managing server 311 may transmit a user authentication request to the account managing server 321. The user authentication request may include the user ID or temporary authentication number.

In operation 1207, the account managing server 321 may transmit a response which depends upon the result of authentication (e.g., succeed or fail) to the entitlement managing server 311.

In operations 1209 and 1211, the response depending on the authentication result may be transferred to the first service server 341a and the electronic device 211 or 221 from the first service server 341a.

Operations 1213, 1215 and 1217 may, for example, be a device registration procedure.

In operation 1213, the first service server 341a may transmit the device registration request to a second service server 341b (e.g., a TAS server). When user authentication is complete (authentication succeeds) as a result of identifying the response in operation 1209, the second service server 341b may perform device registration according to the request and transmit a response (registration succeed or fail) in operation 1215.

In operation 1217, the second service server 341b may store device information about the registered device.

Figure 12B:
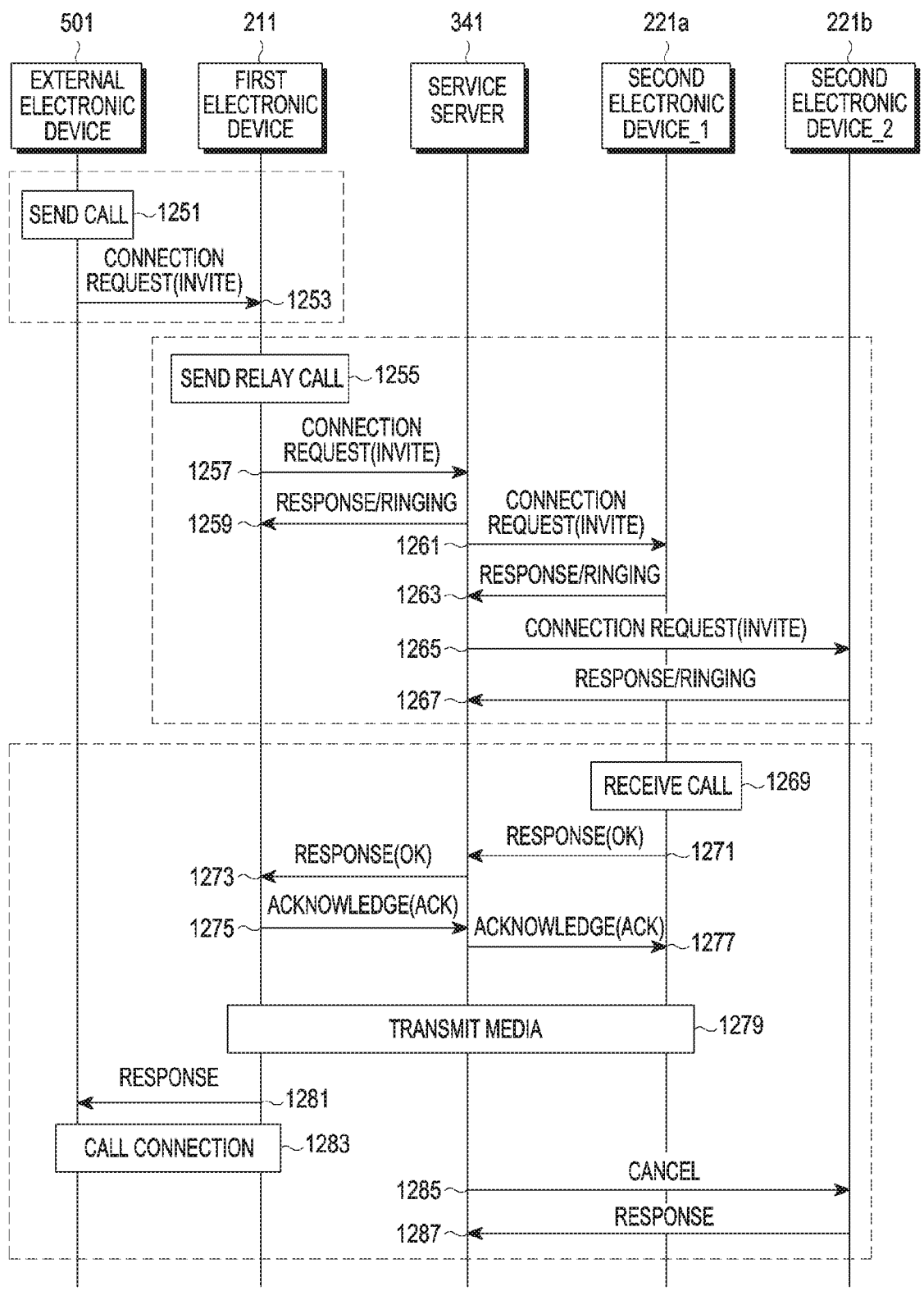
FIG. 12B is a sequence diagram illustrating an example call forking operation of a communication relaying method according to an embodiment.

FIG. 12B is a sequence diagrams illustrating an example call forking operation of a communication relaying method according to an embodiment. FIG. 12B illustrates an example in which a call from the external electronic device 501 is received by second electronic device_1 221a, according to an embodiment.

Operations 1251 and 1253 may be a call dispatch procedure.

In operation 1251, the external electronic device 501 may designate a receiving phone number and generate a call according to a user's (sender's) input. The call may be, e.g., a voice over long term evolution (VoLTE) call.

In operation 1253, the external electronic device 501 may transmit a connection request (invite) for the call to the first electronic device 211 corresponding to the receiving phone number. The connection request may include the receiving phone number.

Operations 1255, 1257, 1259, 1261, 1263, 1265 and 1267 may be a call reception request procedure.

In operation 1255, the first electronic device 211 may generate and send a relay call corresponding to the call. In operation 1257, the first electronic device 211 may transmit a connection request (invite) for the relay call to the service server 341 (e.g., a CSCF/TAS server). The connection request may include the device ID (on the sender-side) of the first electronic device 211 and the group ID (on the receiver side) of the communication group to which the first electronic device 211 belongs.

In operation 1259, the service server 341 may transmit a ringing or response to the connection request to the first electronic device 211.

According to an embodiment, the first electronic device 211 may have a plurality of second electronic devices 221a and 221b set in a communication group.

In operation 1261, the service server 341 may transmit a connection request (invite) for the relay call to second electronic device_1 221a in the communication group set corresponding to the receiving phone number.

In operation 1263, second electronic device_1 221a may transmit a ringing or response to the connection request.

In operation 1265, the service server 341 may transmit a connection request (invite) for the relay call to second electronic device_2 221b in the communication group. In operation 1267, second electronic device_2 221b may transmit a ringing or response to the connection request.

Operations 1269, 1271, 1273, 1275, 1277, 1279, 1281, 1283, 1285 and 1287 may be a call reception/connection procedure.

In operations 1269 and 1271, second electronic device_1 221a may receive a call according to the user's (sender's) input and transmit a response to indicate that the call has been received to the service server 341. In operation 1273, the response may be transferred to the first electronic device 211. In operation 1275, the first electronic device 211 may transmit an acknowledgment (ack) to indicate that the response has been received. In operation 1277, the service server 341 may transfer the ack to second electronic device_1 221a.

In operation 1279, as second electronic device_1 221a receives the call, a call session may be established between the first electronic device 211 and second electronic device_1 221a which pass through the service server 341, and a call connection may be formed between the external electronic device 501 and second electronic device_1 221a via the call session.

In operation 1279, media may be transmitted between the first electronic device 211, the service server 341, and the second electronic device 221. In operation 1281, the first electronic device 211 may transmit a response to the external electronic device 501 which has sent the call. In operation

1283, a call connection may be formed between the external electronic device 501 and the first electronic device 211.

Upon using a communication relaying service, a routing path may be set in order: e.g., external electronic device 501→first electronic device 211→service server 341 (e.g., an IMS server or CSCF/TAS server)→second electronic device_1 221*a* or in the opposite order.

Upon receiving the response of operation 1271 from second electronic device_1 221*a* and transmitting the ack of operation 1277, the service server 341 may transmit a cancellation to second electronic device_2 221*b* and pause or cancel the call connection request in operation 1285. Second electronic device_2 221*b* may transmit a response to the cancellation to the service server 341 in operation 1287.

Figure 13:
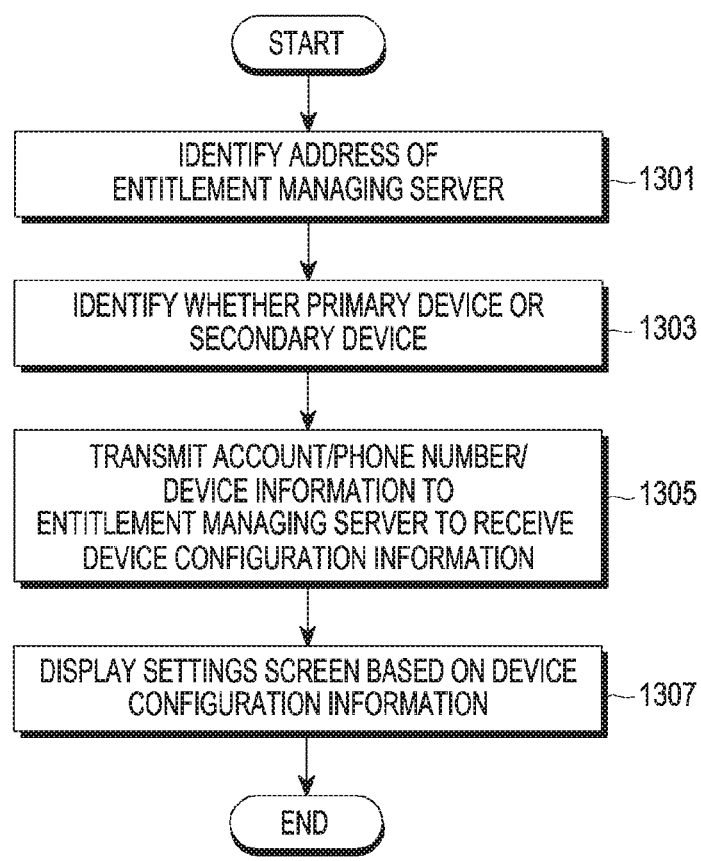
FIG. 13 is a flowchart illustrating an example method of setting a communication group according to an embodiment.

FIG. 13 is a flowchart illustrating an example method of setting a communication group.

In operation 1301, an electronic device 211 or 221 may identify the address of the entitlement managing server 311 in interoperation with a plurality of servers based on pre-stored authentication information.

In operation 1303, the electronic device 211 or 221 may identify whether it is the primary device or secondary device. According to an embodiment, the electronic device 211 or 221 may identify whether it is the primary device or secondary device depending on whether it includes a SIM.

In operation 1305, the electronic device 211 or 221 may transmit information about the device, phone number, and account to the entitlement managing server 311 of the identified address and, in response, receive device configuration information necessary to use a communication relaying function (e.g., the call forking or message sync function). The entitlement managing server 311 may obtain and transfer the device configuration information from the configuration managing server 331.

When the electronic device 211 or 221 is the first electronic device 211, the electronic device 211 or 221 may transfer user account information and phone number-related information (e.g., phone number, unique device value, and/or authentication information) to the entitlement managing server 311.

When the electronic device 211 or 221 is the second electronic device 221, the electronic device 211 or 221 may transfer user account information and device-related information (e.g., device information, unique device value, and/or authentication information) to the entitlement managing server 311.

In operation 1307, the electronic device 211 or 221 may display a function (e.g., the call forking or message sync function) executable based on the received device configuration information on the screen.

Figure 14:
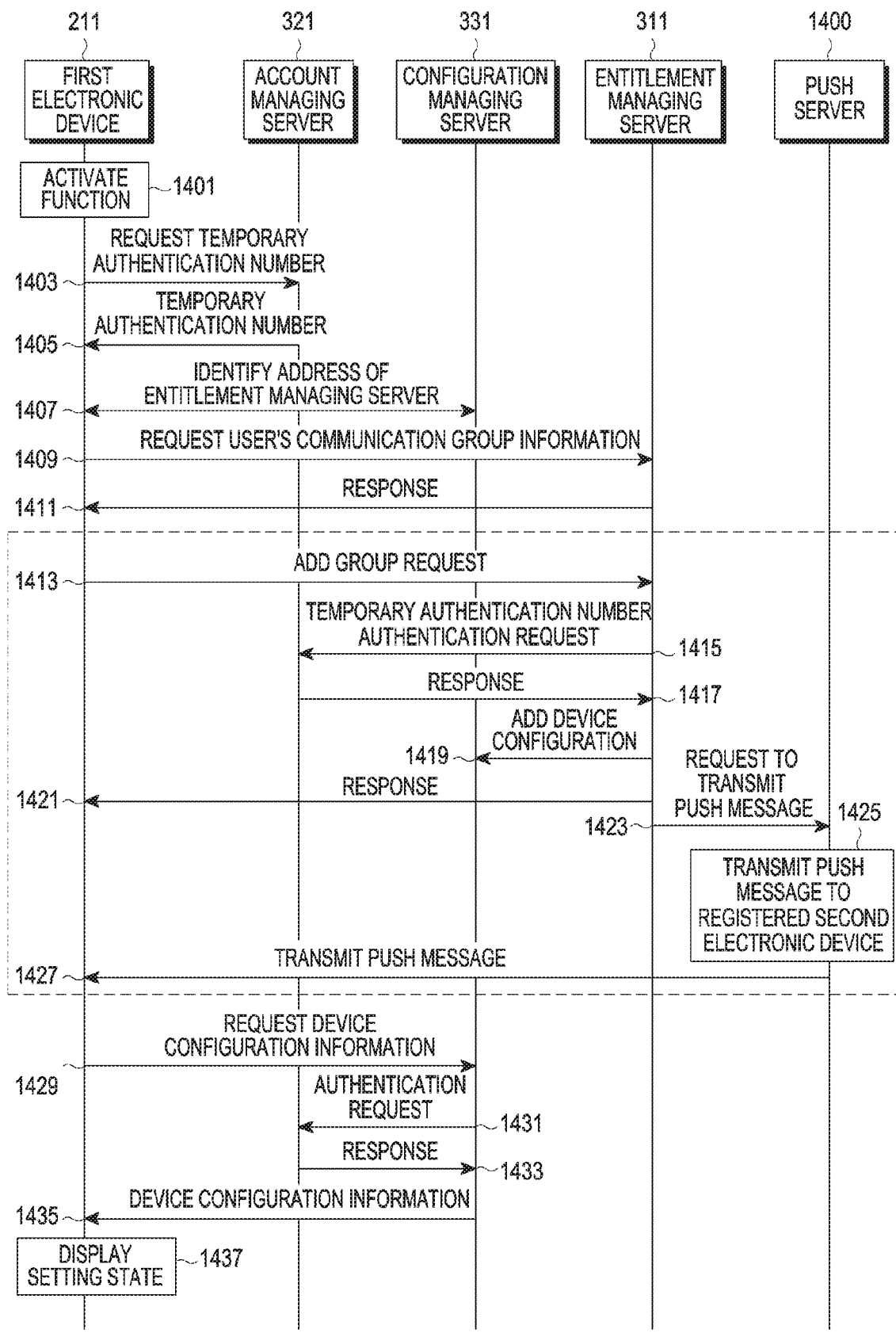
FIG. 14 is a sequence diagram illustrating an example add group operation of a communication group setting method according to an embodiment.

FIG. 14 is a sequence diagram illustrating an example add group operation of a communication group setting method according to an embodiment. The add group of FIG. 14 may be performed by the first electronic device 211.

In operation 1401, the communication relaying function of the first electronic device 211 may be activated. For example, the first electronic device 211 may execute the application for the communication relaying function and then activate the communication relaying function on the settings screen of the application according to a user input.

In operation 1403, the first electronic device 211 may send a request for a temporary authentication number (e.g., an access token) to the account managing server 321 to access the configuration managing server 331 and the entitlement managing server 311.

In operation 1405, the account managing server 321 may transmit the temporary authentication number to the first electronic device 211 in response to the request. The response may include the user ID, temporary authentication number, or mobile country code (MCC).

In operation 1407, the first electronic device 211 may access the configuration managing server 331 using the temporary authentication number, identifying the address of the entitlement managing server 311. For example, the first electronic device 211 may first access the configuration managing server corresponding to the default address stored in the application to obtain the address of the configuration managing server 331 of the region (e.g., Europe or Asia) corresponding to the MCC, and then access the configuration managing server 331 of the identified address to obtain the address of the entitlement managing server 311. The entitlement managing server 311 may return the addresses of the servers for providing the communication relaying function in the form of, e.g., JavaScript object notation (JSON) file.

In operations 1409 and 1411, the first electronic device 211 may send a request for communication group information about the user to the entitlement managing server 311 of the identified address and, in response, receive the communication group information.

Operations 1413, 1415, 1417, 1419, 1421, 1423, 1425 and 1427 may be an add group procedure. When the response of operation 1411 does not include the group ID of the first electronic device 211 (e.g., when no communication group has been generated) or a new group is added, the first electronic device 211 may proceed with the add group procedure of operations 1413 to 1427.

In operation 1413, the first electronic device 211 may send an add group request for adding a communication group to the entitlement managing server 311. For example, the add group request may include the user ID, group ID (phone number), device ID, temporary authentication number, group information (group nickname, etc.), and/or device information (device nickname, etc.).

In operation 1415, the entitlement managing server 311 may send a user authentication request to the account managing server 321 at the temporary authentication number. For example, the user authentication request may include the user ID or temporary authentication number.

In operation 1417, the account managing server 321 may perform authentication and transmit a response thereto (e.g., a result of the user authentication) to the entitlement managing server 311.

When authentication is complete (e.g., authentication succeeds), the entitlement managing server 311 may send a request for adding a device configuration of the communication group to the configuration managing server 331 and transmit the response to the first electronic device 211 in operations 1419 and 1421. Upon requesting to add a device, the group ID (phone number) and device configuration information (e.g., the addresses of the servers providing the communication relaying function) may be registered in the configuration managing server 331. The entitlement managing server 311 may register the device ID of the first electronic device 211 as the first electronic device of the communication group corresponding to the group ID (phone number).

When authentication fails, a push message to indicate the group registration failure may be delivered via the push server 1400 to the first electronic device 211.

In operation 1423, the entitlement managing server 311 may transmit a push message transmission request to the push server 1400 to notify the second electronic device(s)

221, which are push clients having registered to receive a push event of the occurrence of the group registration event.

In operation 1425, the push server 1400 may transmit a push message to indicate that the group registration event has occurred to the registered second electronic device 221.

In operation 1427, the push server 1400 may transmit a push message to indicate that the group registration event has occurred to the first electronic device 211.

In operation 1429, the first electronic device 211 may send a request for device configuration information to the configuration managing server 331. The request may include the user ID, group ID, device ID, or temporary authentication number.

In operations 1431 and 1433, the configuration managing server 331 may transmit an authentication request to the account managing server 321 and receive a response thereto.

When authentication is complete, the configuration managing server 331 may transmit device configuration information to the first electronic device 211 in operation 1435.

In operation 1437, the first electronic device 211 may display a setting state of the communication group reflecting the result of adding the group.

Figure 15:
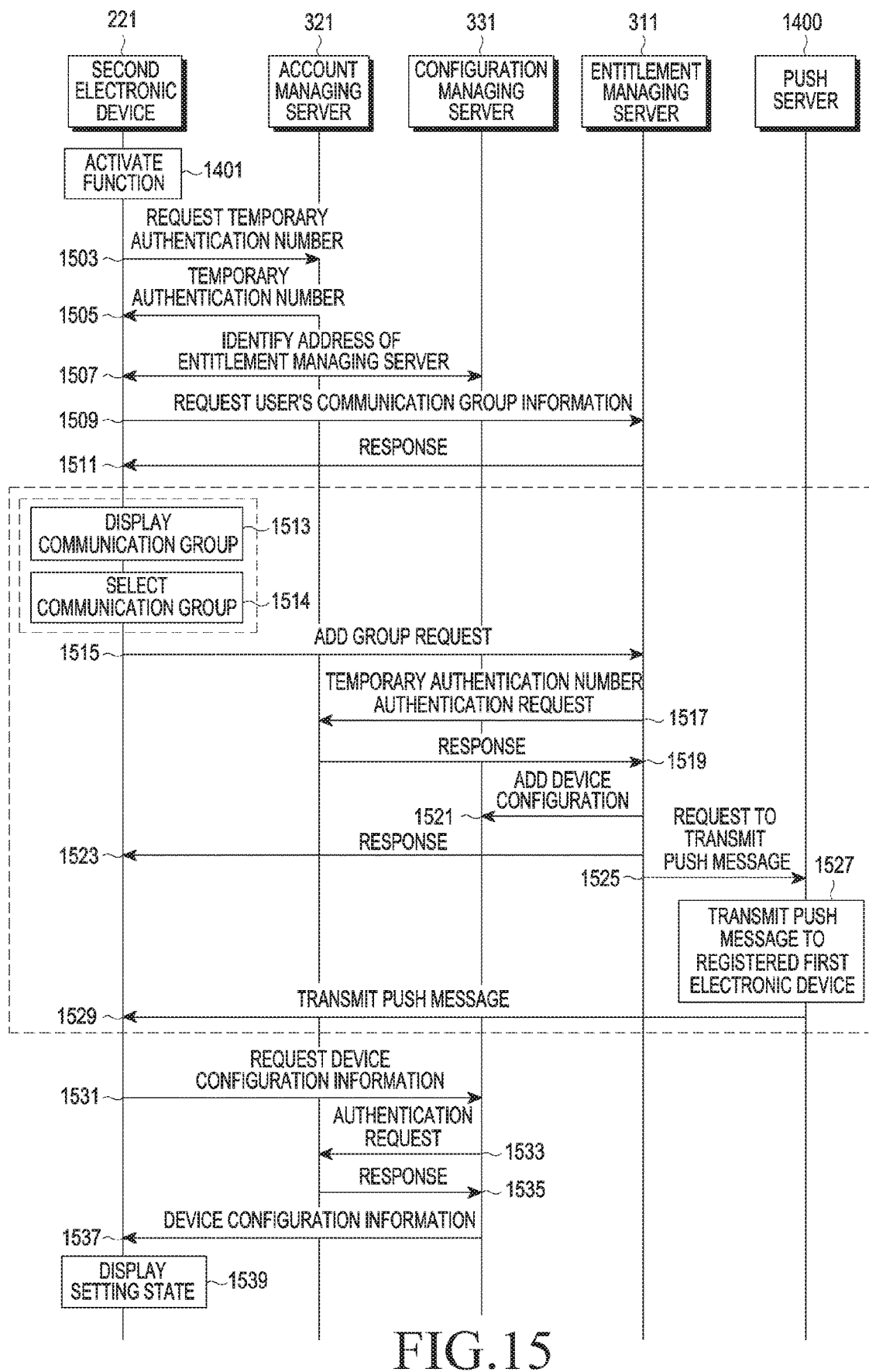
FIGS. 15 and 16 are sequence diagrams illustrating an example add device operation of a communication group setting method according to an embodiment.

FIG. 15 is a sequence diagram illustrating an example add device operation of a communication group setting method according to an embodiment. The add device operation of FIG. 15 may be adding the second electronic device 221 to the communication group and may be performed directly by the second electronic device 221.

Operations 1501, 1503, 1505, 1507, 1509 and 1511 and 1531, 1533, 1535, 1537 and 1539 are similar to operations 1401, 1403, 1405, 1407, 1409 and 1411 and operations 1429, 1431, 1433, 1435 and 1437 of FIG. 14 and a detailed description thereof is not repeated here.

Operations 1513, 1514, 1515, 1517, 1519, 1521, 1523, 1525, 1527 and 1529 may be an add device procedure. According to an embodiment, when the response of operation 1511 does not include the device ID of the second electronic device (e.g., when the second electronic device is not included in the communication group), the second electronic device 221 may perform the add device procedure of operations 1513 to 1529.

When the response of operation 1511 has a plurality of (e.g., two) communication groups, operation 1513 for selecting a group may be performed. In operation 1513, the second electronic device 221 may display the group IDs of the communication groups. In operation 1514, the second electronic device 221 may select a communication group according to a user input.

In operation 1515, the second electronic device 221 may transmit an add device request for adding a device to the selected communication group to the entitlement managing server 311.

In operation 1517, the entitlement managing server 311 may transmit an authentication request to the account managing server 321 at the temporary authentication number. In operation 1519, the account managing server 321 may perform authentication and transmit the response to the entitlement managing server 311.

When authentication is complete, the entitlement managing server 311 may send a request for adding a device configuration of the communication group to the configuration managing server 331 and transmit the response to the second electronic device 221 in operations 1521 and 1523. Upon requesting to add a device, the group ID (phone number) and device configuration information (e.g., the addresses of the servers providing the communication relaying service) may be registered in the configuration managing server 331. The entitlement managing server 311 may register the device ID of the second electronic device 221 as the secondary device of the communication group corresponding to the group ID (phone number).

In operation 1525, the entitlement managing server 311 may transmit a push message transmission request to indicate the occurrence of the add device event to the push server 1400.

In operation 1527, the push server 1400 may transmit a push message to indicate that the add device event has occurred to the push client (e.g., the first electronic device 211 having registered to receive a push event).

In operation 1529, the push server 1400 may transmit a push message to indicate that the add device event has occurred to the second electronic device 221.

Figure 16:
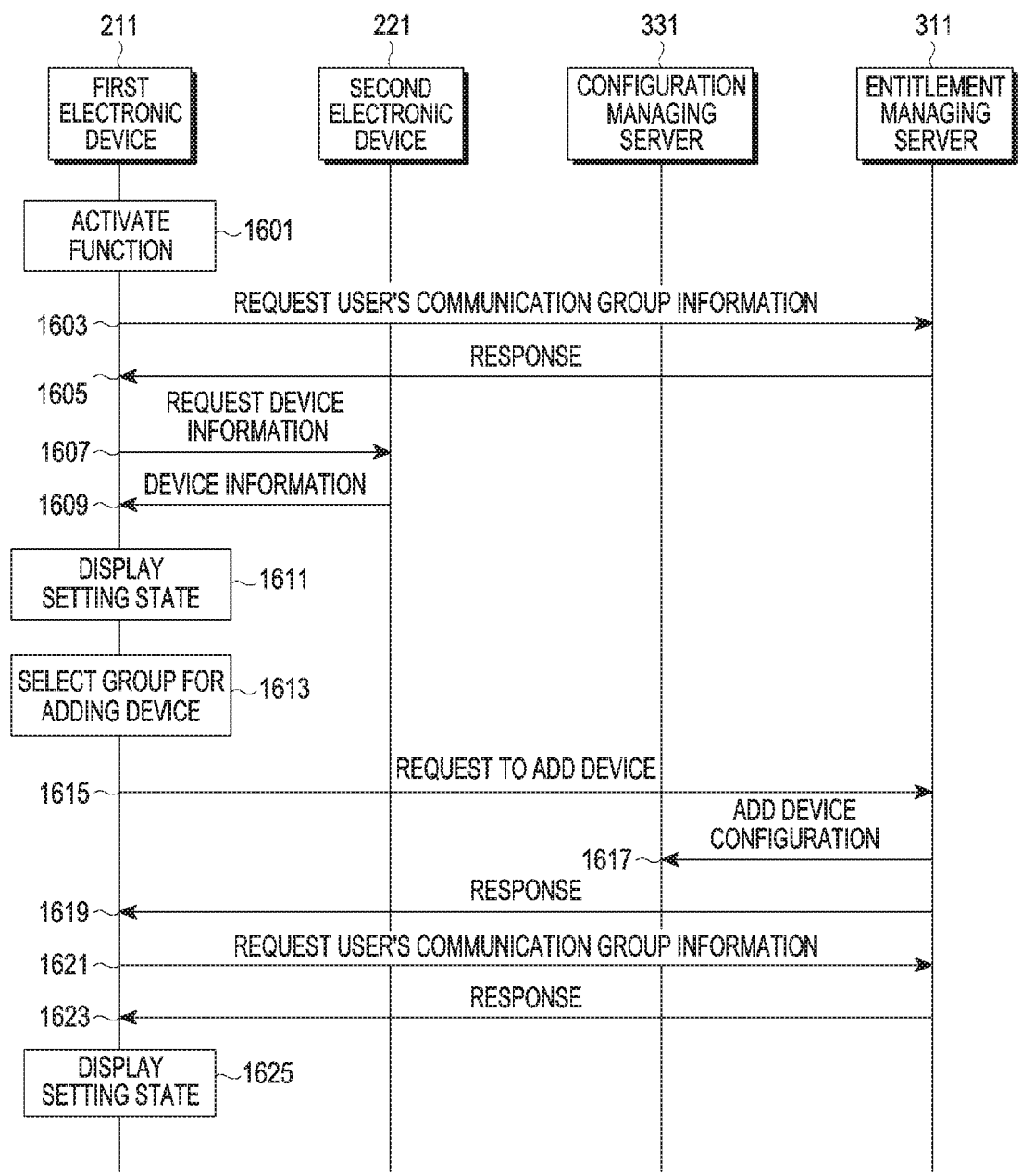

FIG. 16 is a sequence diagram illustrating an example add device operation of a communication group setting method according to an embodiment. The add device operation of FIG. 16 may be adding the second electronic device 221 to the communication group and may be performed by the first electronic device 211.

In operation 1601, the first electronic device 211 may activate the communication relaying function.

In operations 1603 and 1605, the first electronic device 211 may send a request for communication group information about the user to the entitlement managing server 311 and, in response, receive the communication group information.

In operations 1607 and 1609, the first electronic device 211 may send a request for device information to the second electronic device 221 and, in response, receive device information.

In operation 1611, the first electronic device 211 may display a setting state of the status of the current communication group based on the received communication group information.

In operation 1613, the first electronic device 211 may select a communication group for adding a device according to a user input.

In operation 1615, the first electronic device 211 may transmit an add device request to the entitlement managing server 311.

In operations 1617 and 1619, the entitlement managing server 311 may send a request for adding a device configuration of the communication group to the configuration managing server 331 and transmit the response to the first electronic device 211.

In operations 1621 and 1623, the first electronic device 211 may send a request for information about the user's communication group to the entitlement managing server 311 and, in response, receive the communication group information.

In operation 1625, the first electronic device 211 may display a setting state of the communication group reflecting the result of adding the device.

Figure 17A:
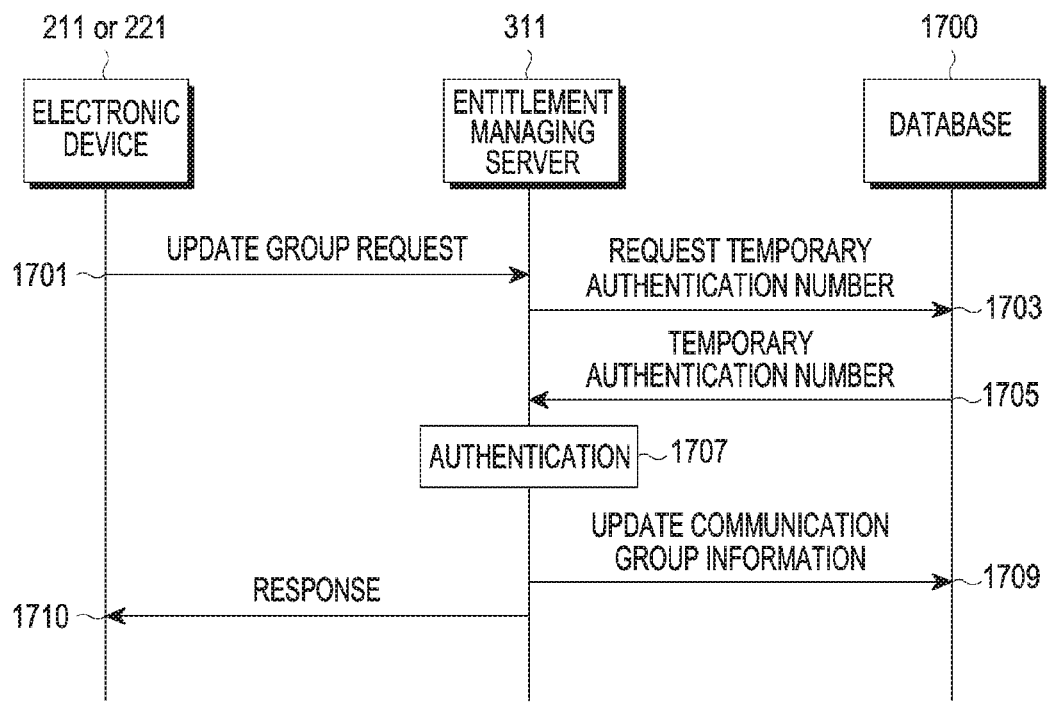
FIGS. 17A and 17B are sequence diagrams illustrating an example update group operation of a communication group setting method according to an embodiment.
Figure 17B:
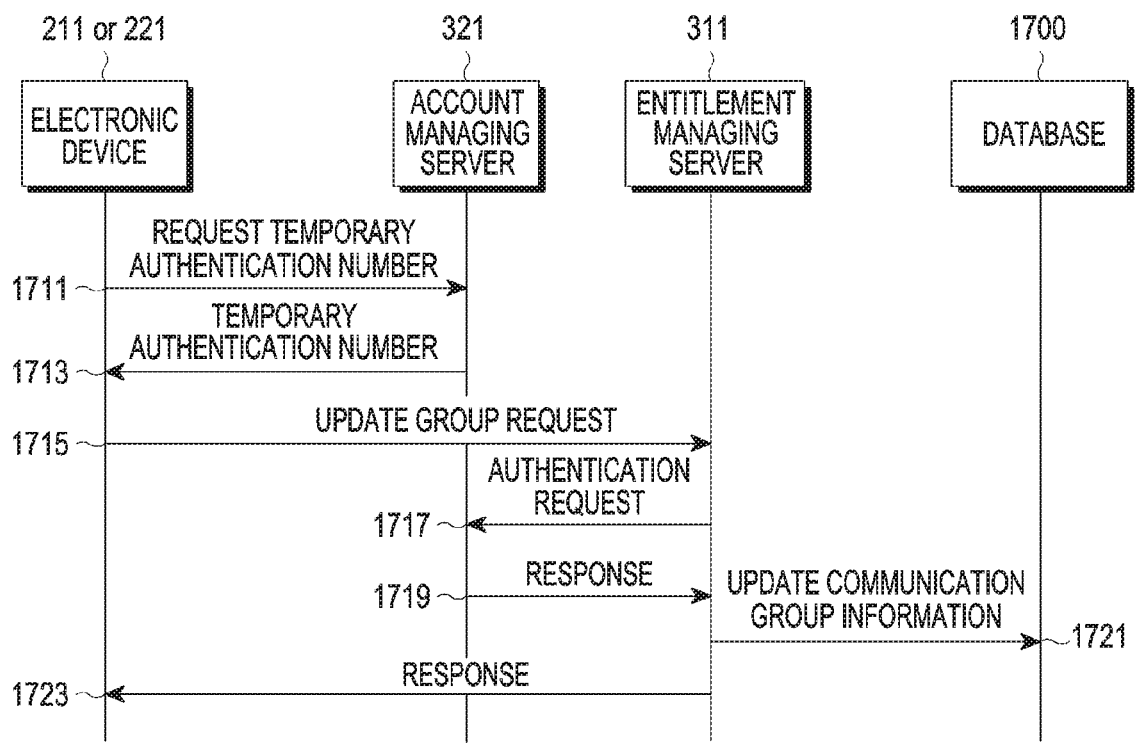

FIGS. 17A and 17B are sequence diagrams illustrating an example update group operation of a communication group setting method according to an embodiment.

According to an embodiment, a database 1700 may store information about the communication group (e.g., user ID, group ID (phone number), device ID, and/or information about devices in each communication group). The database 1700 may be implemented inside or outside the entitlement managing server 311.

An electronic device (e.g., the first electronic device 211 or the second electronic device 221) may receive the user ID and temporary authentication number from the entitlement managing server 311 to access the entitlement managing server 311 and identify the address of the entitlement managing server 311 from the configuration managing server 331 using the temporary authentication number.

Referring to FIG. 17A, in operation 1701, the electronic device 211 or 221 may access the entitlement managing server 311 of the identified address and transmit an update group request. For example, the update group request may include the user ID, group ID (phone number), device ID, a first temporary authentication number, or group information (e.g., a new device ID for changing the first electronic device in the communication group, communication group activation information, or the nickname of the communication group).

In operations 1703 and 1705, the entitlement managing server 311 may send a request for a second temporary authentication number to the database 1700 and, in response, receive the second temporary authentication number.

In operation 1707, the entitlement managing server 311 may perform authentication on the user who has sent an update group request using the first and second temporary authentication numbers.

The entitlement managing server 311 may search the database based on the user ID, group ID, and device ID, determining whether the first temporary authentication number is valid (e.g., whether the user is a valid user).

When authentication is complete, the entitlement managing server 311 may update the database 1700 with the communication group information in operation 1709.

In operation 1710, the entitlement managing server 311 may transmit a response to the update group request (update success or failure) to the electronic device 211 or 221.

FIG. 17B illustrates an example in which the entitlement managing server 311 performs authentication via the account managing server 321 in the update group procedure.

Referring to FIG. 17B, in operations 1711 and 1713, an electronic device (e.g., the first electronic device 211 or second electronic device 221) may send a request for a temporary authentication number to the account managing server 321 and, in response, receive a temporary authentication number.

In operation 1715, the electronic device 211 or 221 may access the entitlement managing server 311 to transmit an update group request. For example, the update group request may include the user ID, group ID (phone number), device ID, the authentication number, or group information (e.g., a new device ID for changing the first electronic device in the communication group, communication group activation information, or the nickname of the communication group).

In operations 1717 and 1719, the entitlement managing server 311 may send a request for user authentication to the account managing server 321 based on the temporary authentication number and receive a response depending on the result of authentication.

When authentication is complete, the entitlement managing server 311 may update the communication group information stored in the database 1700 according to the update group request of operation 1715 and transmit a response (e.g., update success or failure) according to the update group request to the electronic device 211 or 221 in operations 1721 and 1723.

Figure 18A:
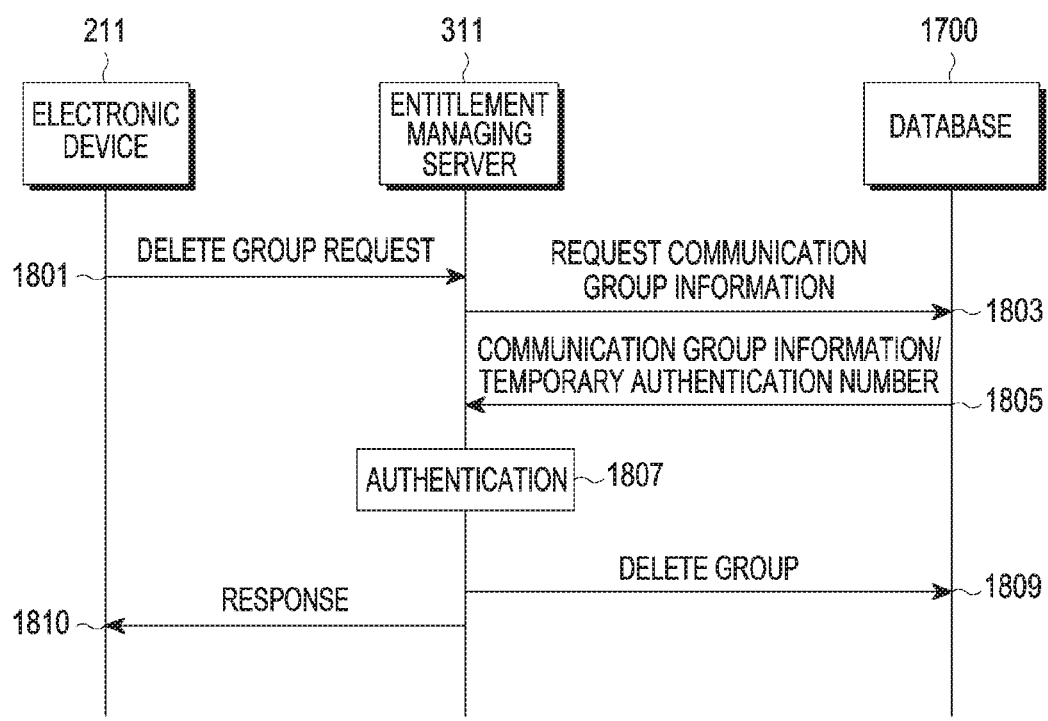
FIGS. 18A and 18B are sequence diagrams illustrating an example delete group operation of a communication group setting method according to an embodiment.
Figure 18B:
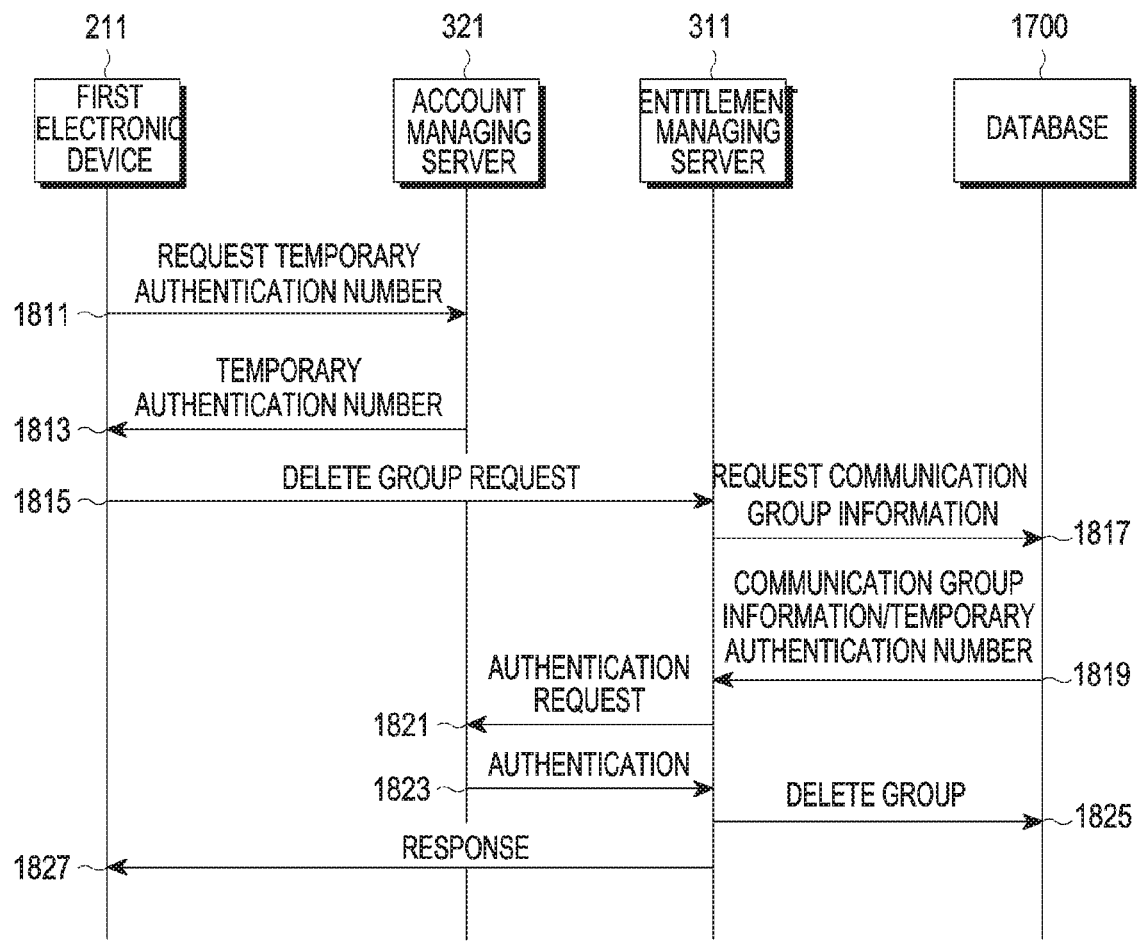

FIGS. 18A and 18B are sequence diagrams illustrating an example delete group operation of a communication group setting method according to an embodiment.

Referring to FIG. 18A, in operation 1801, the first electronic device 211 may transmit a delete group request to the entitlement managing server 311.

For example, the delete group request may include the user ID, the group ID (phone number) to be deleted, device ID, first temporary authentication number, and/or group information (e.g., group nickname).

In operations 1803 and 1805, the entitlement managing server 311 may send a request for communication group information to the database 1700 and, in response, receive communication group information and a second temporary authentication number.

In operation 1807, the entitlement managing server 311 may compare the received first temporary authentication number and second temporary authentication number, thereby performing authentication on the user who has sent the delete group request.

When authentication is complete, the entitlement managing server 311 may send a request for deleting a communication group to the database 1700 in operation 1809.

In operation 1810, the entitlement managing server 311 may transmit a response (success or failure in deleting the group) for the delete group request to the electronic device 211 or 221.

FIG. 18B illustrates an example in which the entitlement managing server 311 performs authentication via the account managing server 321 in the delete group procedure.

Referring to FIG. 18B, in operations 1811 and 1813, the first electronic device 211 may send a request for a temporary authentication number to the account managing server 321 and, in response, receive a temporary authentication number.

In operation 1815, the first electronic device 211 may transmit a delete group request to the entitlement managing server 311.

In operations 1817 and 1819, the entitlement managing server 311 may send a request for communication group information to the database 1700 and, in response, receive communication group information and a second temporary authentication number.

In operations 1821 and 1823, the entitlement managing server 311 may perform authentication on the user who has sent the delete group request using the temporary authentication number received from the account managing server 321.

When authentication is complete, the entitlement managing server 311 may send a request for deleting a communication group to the database 1700 in operation 1825.

In operation 1827, the entitlement managing server 311 may transmit a response to the delete group request to the first electronic device 211.

Figure 19A:
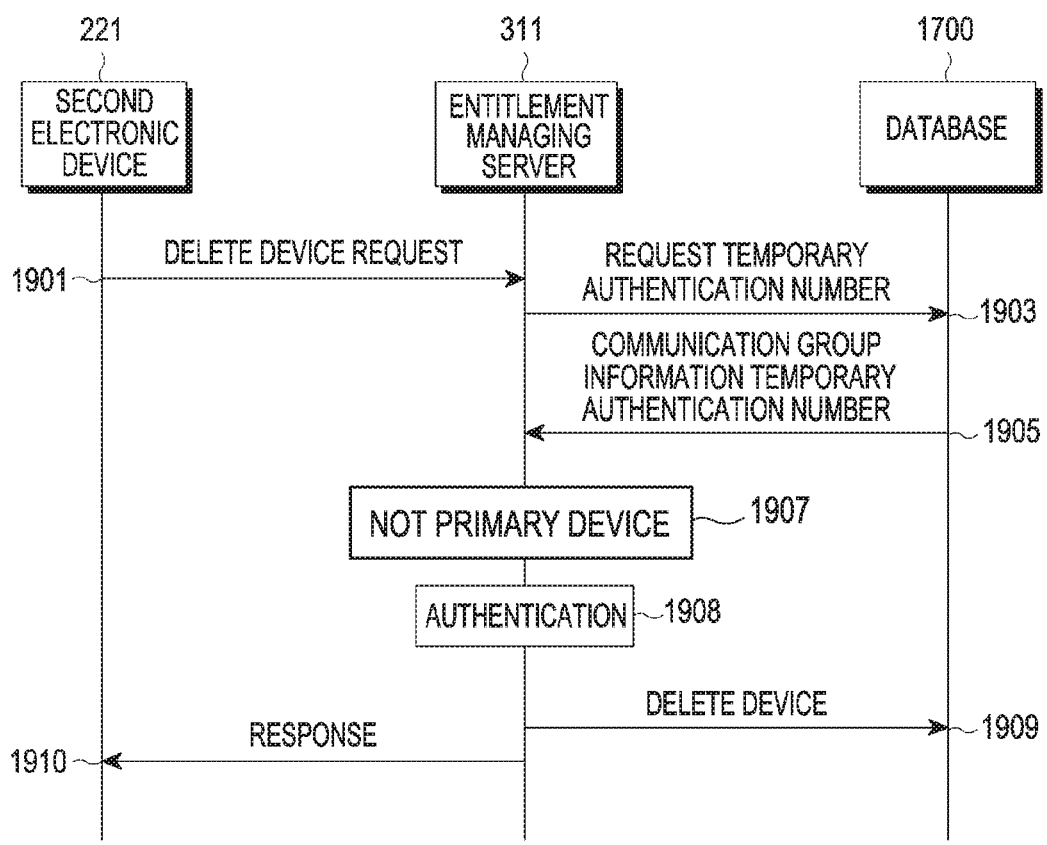
FIGS. 19A and 19B are sequence diagrams illustrating an example delete device operation of a communication group setting method according to an embodiment.
Figure 19B:
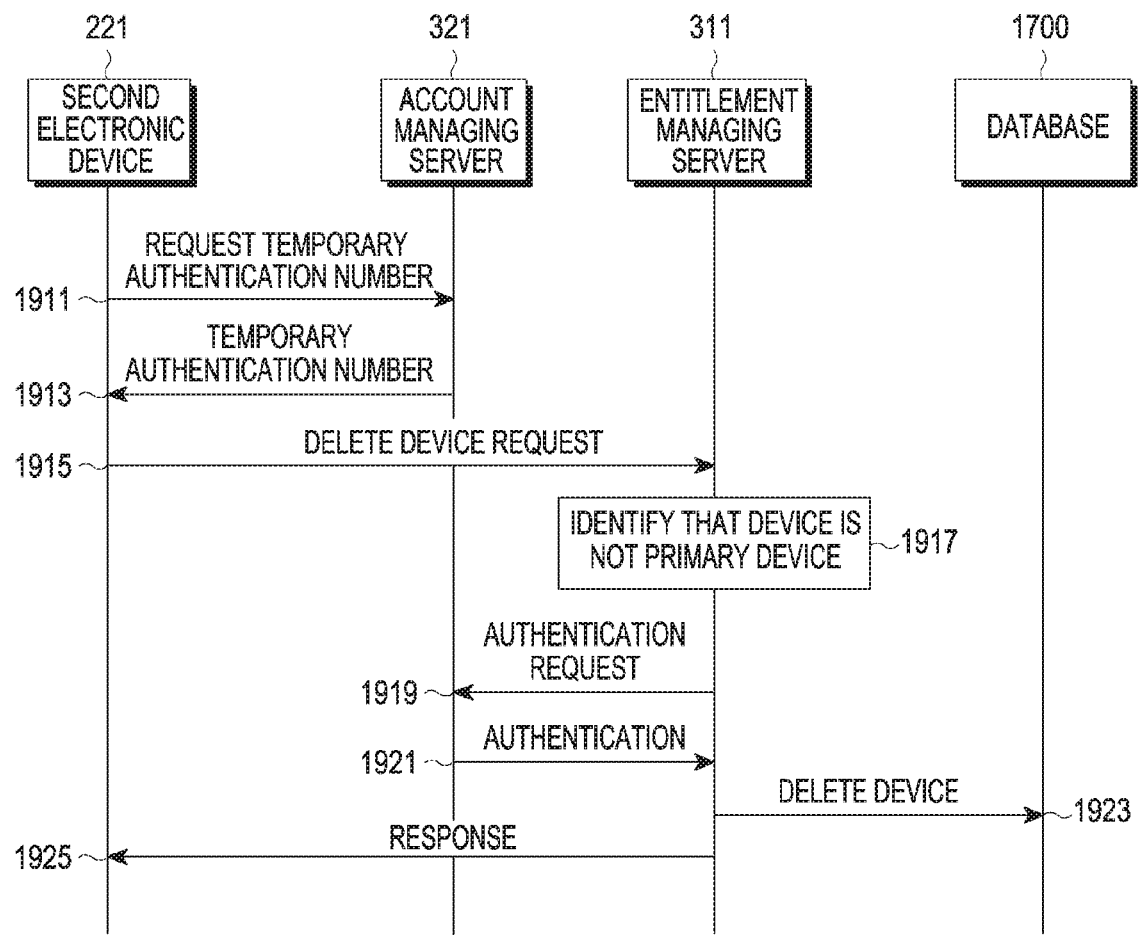

FIGS. 19A and 19B are sequence diagrams illustrating an example delete device operation of a communication group setting method according to an embodiment.

Although FIGS. 19A and 19B illustrate an example of deleting a device by the second electronic device, deleting a device may also be performed by the first electronic device 211.

Referring to FIG. 19A, in operation 1901, the second electronic device 221 may transmit a delete device request to the entitlement managing server 311. For example, the delete device request may include the user ID, group ID (phone number), the device ID to be deleted, the first temporary authentication number, and/or group information (e.g., group nickname).

In operations 1903 and 1905, the entitlement managing server 311 may send a request for communication group information to the database 1700 and, in response, receive communication group information and a second temporary authentication number.

In operation 1907, the entitlement managing server 311 may identify that the device having sent the delete device request is not the primary device based on, e.g., the device ID contained in the delete device request. According to an embodiment, operation 1907 may be omitted.

In operation 1908, the entitlement managing server 311 may perform authentication on the user who has sent the delete device request using the received first temporary authentication number and second temporary authentication number.

When authentication is complete (authentication succeeds), the entitlement managing server 311 may send an instruction for deleting a device to the database 1700 in operation 1909.

In operation 1910, the entitlement managing server 311 may transmit a response to the delete device request (e.g. device deleted or deletion succeeds) to the second electronic device 221.

FIG. 19B illustrates an example in which the entitlement managing server 311 performs authentication via the account managing server 321 in the delete device procedure.

In operations 1911 and 1913, the second electronic device 221 may send a request for a temporary authentication number to the account managing server 321 and, in response, receive a temporary authentication number.

In operation 1915, the second electronic device 221 may transmit a delete device request to the entitlement managing server 311.

In operation 1917, the entitlement managing server 311 may identify that the device having sent the delete device request is not the primary device based on, e.g., the device ID contained in the delete device request. According to an embodiment, operation 1917 may be omitted.

In operations 1919 and 1921, the entitlement managing server 311 may perform authentication on the user who has sent the delete device request using the temporary authentication number received from the account managing server 321.

When authentication is complete, the entitlement managing server 311 may send an instruction for deleting a device to the database 1700 in operation 1923.

In operation 1925, the entitlement managing server 311 may transmit a response to the delete device request to the second electronic device 221.

According to an embodiment, an electronic device (e.g., the first electronic device 211) may include a communication circuit (e.g., the communication circuit 217), a display (e.g., the display 213), a processor (e.g., the processor 215) operatively connected with the communication circuit and the display, and a memory (e.g., the memory 219) operatively connected with the processor. The memory may store instructions which, when executed, configure the processor to control the electronic device to: receive a call from a first external electronic device (e.g., the external electronic device 501) via the communication circuit, identify a receiving phone number of the call, identify a second external electronic device (e.g., the second electronic device 221) in a communication group set corresponding to the receiving phone number among at least one phone number registered based on information about a user account stored in the memory, and relay the call to the identified second external electronic device via the communication circuit.

According to an embodiment, the communication group may include the electronic device (e.g., the first electronic device 211) and at least one second external electronic device (e.g., the second electronic device 221) corresponding to the at least one phone number.

According to an embodiment, the instructions may, when executed, configure the processor to control the electronic device to: generate a call session between the electronic device (e.g., the first electronic device 211) and the second external electronic device (e.g., the second electronic device 221) passing through a first external server (e.g., the service server 341) based on the call being received by the identified second external electronic device (e.g., the second electronic device 221), and connect a call between the first external electronic device (e.g., the external electronic device 501) and the second external electronic device (e.g., the second electronic device 221) through the call session.

According to an embodiment, the instructions may, when executed, configure the processor to control the electronic device to: send a request for information about the communication group to a second external server (e.g., the entitlement managing server 311) via the communication circuit, receive the information about the communication group from the second external server via the communication circuit, and identify the second external electronic device (e.g., the second electronic device 221) included in the communication group based on the received information.

According to an embodiment, the instructions may, when executed, configure the processor to control the electronic device to: transmit a call connection request including a user identity (ID), a group ID, a device ID, and authentication information to a third external server (e.g., the configuration managing server 331), receive device configuration information from the third external server in response to the call connection request, and relay the call to the second external electronic device (e.g., the external electronic device 501) included in the communication group based on the received device configuration information.

According to an embodiment, the instructions, when executed, may configure the processor to control the electronic device to: display, through the display, a settings screen for setting at least one communication group corresponding to the at least one phone number registered in the user account.

According to an embodiment, the settings screen may include at least one of areas for generating, adding, updating, or deleting a communication group or adding a device to or deleting a device from a communication group.

According to an embodiment, an electronic device (e.g., the first electronic device 211) may include a communication circuit (e.g., the communication circuit 217), a display (e.g., the display 213), a processor (e.g., the processor 215) operatively connected with the communication circuit and the display, and a memory (e.g., the memory 219) operatively connected with the processor. The memory may stores instructions which, when executed, configure the processor to control the electronic device to: display, through the display, a settings screen for setting at least one communication group corresponding to at least one phone number registered in the user account, each communication group including the electronic device (e.g., the first electronic device 211) and at least one external electronic device (e.g., the second electronic device 221), wherein a communication relaying function based on a same phone number is provided in a same communication group, generate a request for setting the at least one communication group based on an input on the settings screen, and transmit the request to an external server (e.g., the entitlement managing server 311) via the communication circuit.

According to an embodiment, the communication relaying function may include at least one of a call forking function, a message sync function, or a communication log sync function between electronic devices in the same communication group.

According to an embodiment, the instructions may, when executed, configure the processor to control the electronic device to store information about a user account and generate a second setting request for adding a new external electronic device (e.g., the second electronic device 221) to one of the at least one communication group or deleting an existing external electronic device based on a second user input on the settings screen, and transmit the second setting request to the external server (e.g., the entitlement managing server 311) via the communication circuit.

According to an embodiment, the settings screen may include a first area for setting whether to activate a communication relaying function of the electronic device, a second area displaying a phone number of a communication group, and a third area displaying a device included in the communication group and setting whether to activate a communication relaying function of the communication group.

According to an embodiment, the settings screen may include at least one of areas for generating, adding, updating, or deleting a communication group.

According to an embodiment, the settings screen may include at least one of an area for adding a new second external electronic device to a set communication group or an area for deleting an existing external electronic device from the set communication group.

According to an embodiment, a method of relaying communication by an electronic device comprises receiving, by the electronic device (e.g., the first electronic device 211), a call from a first external electronic device (e.g., the external electronic device 501), identifying, by the electronic device, a receiving phone number of the call, identifying, by the electronic device, a second external electronic device (e.g., the second electronic device 221) in a communication group set corresponding to the receiving phone number among at least one phone number registered based on a user account, and relaying, by the electronic device, the call to the identified second external electronic device.

According to an embodiment, a plurality of phone numbers may be registered in the user account. A communication group including the electronic device (e.g., the first electronic device 211) and at least one second external electronic device (e.g., the second electronic device 221) may be set corresponding to each phone number.

According to an embodiment, relaying the call may include, based on the call being received by the identified second external electronic device, generating a call session between the electronic device (e.g., the first electronic device 211) and the second external electronic device (e.g., the second electronic device 221) passing through a first external server (e.g., the service server 341) and connecting a call between the external electronic device and the second external electronic device through the call session.

According to an embodiment, identifying the second external electronic device may include sending a request for information about the communication group to a second external server, receiving the information about the communication group from the second external server, and identifying the second external electronic device included in the communication group based on the received information.

According to an embodiment, relaying the call may include transmitting a call connection request including a user identity (ID), a group ID, a device ID, and authentication information to a third external server (e.g., the configuration managing server 331), receiving device configuration information from the third external server in response to the call connection request, and relaying the call to the second external electronic device included in the communication group based on the received device configuration information.

According to an embodiment, the method may further comprise displaying a settings screen for setting at least one communication group corresponding to the at least one phone number registered in the user account.

According to an embodiment, the settings screen may include at least one of areas for generating, adding, updating, or deleting a communication group or adding a device to or deleting a device from a communication group.

As is apparent from the foregoing description, according to various example embodiments, it is possible to increase use convenience and result in efficiency in relation to the communication relaying function capable of implementing inter-electronic device continuity.

According to various example embodiments, it is possible to simply register one or more groups for communication relaying in one user account without the need for adding an account.

According to various example embodiments, it is possible to simply manage one or more groups for communication relaying registered in a logged in account.

While the disclosure has been illustrated and described with reference to various example embodiments thereof, it will be understood by those skilled in the art that the various example embodiments are intended to be illustrative, not limiting, and that various changes in form and details may be made therein without departing from the true spirit and full scope of the disclosure as defined, for example, by the appended claims and their equivalents.

What is claimed is:

1. An electronic device, configured to:
receive, from a first external electronic device, a request for relaying an incoming call received by the first external electronic device from a second external electronic device,
identify a receiving phone number of the incoming call, based on the request for relaying the incoming call, and information about a user account of the first external electronic device, wherein the information about the user account includes information relating to a first phone number registered to the user account, a first communication group corresponding to the first phone number, a second phone number registered to the user account and a second communication group corresponding to the second phone number, and wherein the receiving phone number is one of the first phone number and the second phone number,
based on the receiving phone number of the incoming call corresponding to the first phone number, identify, based on the information about the user account, the first communication group, and relay the incoming call to a third external electronic device included in the first communication group, and
based on the receiving phone number of the incoming call corresponding to the second phone number, identify, based on the information about the user account, the second communication group, and relay the incoming call to a fourth external electronic device included in the second communication group,
wherein the first communication group includes the first external electronic device and the third external electronic device, and the second communication group includes the first external electronic device and the fourth external electronic device.

2. The electronic device of claim 1, being configured to:
based on the receiving phone number of the incoming call corresponding to the first phone number, establish a first call session between the first external electronic device and the third external electronic device, and
based on the receiving phone number of the incoming call corresponding to the second phone number, establish a second call session between the first external electronic device and the fourth external electronic device.

3. The electronic device of claim 1, being further configured to:
transmit, to the third external electronic device or the fourth external electronic device, a call connection request including at least one of a group ID of the first external electronic device, or a device ID of the first external electronic device,
receive a call connection response from the third external electronic device or the fourth external electronic device,
based on receiving the call connection response from the third external electronic device, relay the incoming call to the third external electronic device, and
based on receiving the call connection response from the fourth external electronic device, relay the incoming call to the fourth external electronic device.

4. The electronic device of claim 1, being further configured to:
receive, from the first external electronic device, a device registration request for registering another external electronic device to the first communication group or the second communication group, and
based on receiving the device registration request, register the other external electronic device to the first communication group or the second communication group.

5. The electronic device of claim 4, being further configured to:
based on receiving the device registration request, transmit a user authentication request for identifying whether a user of the first external electronic device is a valid user to a server.

6. The electronic device of claim 5, being further configured to:
receive a user authentication response from the server, wherein the user authentication response includes a user authentication result, and
based on the user authentication result, register the other external electronic device to the first communication group or the second communication group.

7. A method for controlling an electronic device, the method comprising:
receiving, from a first external electronic device, a request for relaying an incoming call received by the first external electronic device from a second external electronic device;
identifying a receiving phone number of the incoming call based on the request for relaying the incoming call, and information about a user account of the first external electronic device, wherein the information about the user account includes information relating to a first phone number registered to the user account, a first communication group corresponding to the first phone number, a second phone number registered to the user account and a second communication group corresponding to the second phone number, and wherein the receiving phone number is one of the first phone number and the second phone number;
based on the receiving phone number of the incoming call corresponding to the first phone number, identifying, based on the information about the user account, the first communication group, and relaying the incoming call to a third external electronic device included in the first communication group; and
based on the receiving phone number of the incoming call corresponding to the second phone number, identifying, based on the information about the user account, the second communication group, and relaying the incoming call to a fourth external electronic device included in the second communication group,
wherein the first communication group includes the first external electronic device and the third external electronic device, and the second communication group includes the first external electronic device and the fourth external electronic device.

8. The method of claim 7,
wherein the relaying of the incoming call to the third external electronic device comprises:
based on the receiving phone number of the incoming call corresponding to the first phone number, establishing a first call session between the first external electronic device and the third external electronic device, and
wherein the relaying of the incoming call to the fourth external electronic device comprises:
based on the receiving phone number of the incoming call corresponding to the second phone number, establishing a second call session between the first external electronic device and the fourth external electronic device.

9. The method of claim 7, further comprising:
transmitting, to the third external electronic device or the fourth external electronic device, a call connection request including at least one of a group ID of the first external electronic device, or a device ID of the first external electronic device;
receiving a call connection response from the third external electronic device or the fourth external electronic device;
based on receiving the call connection response from the third external electronic device, relaying the incoming call to the third external electronic device; and
based on receiving the call connection response from the fourth external electronic device, relaying the incoming call to the fourth external electronic device.

10. The method of claim 7, further comprising:
receiving, from the first external electronic device, a device registration request for registering another external electronic device to the first communication group or the second communication group; and
based on receiving the device registration request, registering the other external electronic device to the first communication group or the second communication group.

11. The method of claim 10, further comprising:
based on receiving the device registration request, transmitting a user authentication request for identifying whether a user of the first external electronic device is a valid user to a server.

12. The method of claim 11, wherein the registering of the other external electronic device to the first communication group or the second communication group comprises:

receiving a user authentication response from the server, wherein the user authentication response includes a user authentication result; and based on the user authentication result, registering the other external electronic device to the first communication group or the second communication group.

13. A non-transitory computer-readable medium, wherein the non-transitory computer-readable medium stores instructions configured to, when executed by a processor, cause the processor to:

receive, from a first external electronic device, a request for relaying an incoming call received by the first external electronic device from a second external electronic device, identify a receiving phone number based on the request for relaying the incoming call and information about a user account of the first external electronic device, wherein the information about the user account includes information relating to a first phone number registered to the user account, a first communication group corresponding to the first phone number, a second phone number registered to the user account and a second communication group corresponding to the second phone number, and wherein the receiving phone number is one of the first phone number and the second phone number, based on the receiving phone number of the incoming call corresponding to the first phone number, identify, based on the information about the user account, the first communication group and control the communication circuit to relay the incoming call to a third external electronic device included in the first communication group, and based on the receiving phone number of the incoming call corresponding to the second phone number, identify, based on the information about the user account, the second communication group and control the communication circuit to relay the incoming call to a fourth external electronic device included in the second communication group, wherein the first communication group includes the first external electronic device and the third external electronic device, and wherein the second communication group includes the first external electronic device and the fourth external electronic device.

14. The non-transitory computer-readable medium of claim 13, wherein the instructions are further configured to cause the processor to:

based on the receiving phone number of the incoming call corresponding to the first phone number, establish a first call session between the first external electronic device and the third external electronic device, and based on the receiving phone number of the incoming call corresponding to the second phone number, establish a second call session between the first external electronic device and the fourth external electronic device.

15. The non-transitory computer-readable medium of claim 13, wherein the instructions are further configured to cause the processor to:

transmit, to the third external electronic device or the fourth external electronic device, a call connection request including at least one of a group ID of the first external electronic device, or a device ID of the first external electronic device, receive a call connection response from the third external electronic device or the fourth external electronic device, based on receiving the call connection response from the third external electronic device, relay the incoming call to the third external electronic device, and based on receiving the call connection response from the fourth external electronic device, relay the incoming call to the fourth external electronic device.

16. The non-transitory computer-readable medium of claim 13, wherein the instructions are further configured to cause the processor to:

receive, from the first external electronic device, a device registration request for registering another external electronic device to the first communication group or the second communication group, and based on receiving the device registration request, register the other external electronic device to the first communication group or the second communication group.

17. The non-transitory computer-readable medium of claim 16, wherein the instructions are further configured to cause the processor to:

based on receiving the device registration request, transmit a user authentication request for identifying whether a user of the first external electronic device is a valid user to a server.

18. The non-transitory computer-readable medium of claim 17, wherein the instructions are further configured to cause the processor to:

receive a user authentication response from the server, wherein the user authentication response includes a user authentication result, and based on the user authentication result, register the other external electronic device to the first communication group or the second communication group.

* * * * *